US009266423B2

(12) United States Patent
Hoshinoya et al.

(10) Patent No.: US 9,266,423 B2
(45) Date of Patent: Feb. 23, 2016

(54) VEHICLE DRIVING DEVICE

(75) Inventors: Takeshi Hoshinoya, Wako (JP); Keiichi Ooiso, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/124,139

(22) PCT Filed: Jun. 6, 2012

(86) PCT No.: PCT/JP2012/064583
§ 371 (c)(1),
(2), (4) Date: Dec. 5, 2013

(87) PCT Pub. No.: WO2012/169542
PCT Pub. Date: Dec. 13, 2012

(65) Prior Publication Data
US 2014/0097060 A1    Apr. 10, 2014

(30) Foreign Application Priority Data

Jun. 7, 2011  (JP) .................................. 2011-127533
Jun. 28, 2011  (JP) .................................. 2011-143213

(51) Int. Cl.
*H02K 5/20* (2006.01)
*B60K 1/02* (2006.01)
(Continued)

(52) U.S. Cl.
CPC ................. *B60K 11/02* (2013.01); *B60K 6/448* (2013.01); *B60K 6/48* (2013.01); *B60K 6/52* (2013.01); *B60K 7/0007* (2013.01); *B60K 17/02* (2013.01); *B60K 17/046* (2013.01); *B60K 20/00* (2013.01); *B60L 11/14* (2013.01); *H02K 7/006* (2013.01); *H02K 9/19* (2013.01);
(Continued)

(58) Field of Classification Search
CPC ..................... B60K 2001/006; B60Y 2306/05
See application file for complete search history.

(56) References Cited

U.S. PATENT DOCUMENTS

2008/0182712 A1   7/2008  Kira et al.
2009/0184591 A1*  7/2009  Hoshino et al. ................ 310/54
(Continued)

FOREIGN PATENT DOCUMENTS

CN         1178172 A       4/1998
DE    102008001622 A1     11/2009
(Continued)

OTHER PUBLICATIONS

Japanese Office Action dated Mar. 25, 2014, issued in corresponding Japanese application No. 2011-127533 (3 pages).
(Continued)

*Primary Examiner* — Rodney H Bonck
*Assistant Examiner* — Lillian Nguyen
(74) *Attorney, Agent, or Firm* — Westerman, Hattori, Daniels & Adrian, LLP

(57) ABSTRACT

A first electric motor cooling flow passage (120A) and a first electric motor lubrication flow passage (121A) supply oil from an electric oil pump (70) through the outer side of one end (E1) of the first electric motor (2A) to the portions (A1, A2) of the first electric motor (2A) which are to be cooled/lubricated. A second electric motor cooling flow passage (120B) and a second electric motor lubrication flow passage (121B) supply oil from the electric oil pump (70) through the outer side of the other end (E2) of the second electric motor (2B) to the portions (B1, B2) of the second electric motor (2B) which are to be cooled/lubricated.

22 Claims, 11 Drawing Sheets

(51) Int. Cl.
*B60K 11/02* (2006.01)
*H02K 7/00* (2006.01)
*H02K 9/19* (2006.01)
*B60K 7/00* (2006.01)
*B60K 17/02* (2006.01)
*B60K 17/04* (2006.01)
*B60K 6/448* (2007.10)
*B60K 6/48* (2007.10)
*B60K 6/52* (2007.10)
*B60K 20/00* (2006.01)
*B60L 11/14* (2006.01)
*B62D 21/11* (2006.01)
*B60K 1/00* (2006.01)

(52) U.S. Cl.
CPC .. *B60K 2001/006* (2013.01); *B60K 2007/0046* (2013.01); *B60K 2007/0092* (2013.01); *B60Y 2306/03* (2013.01); *B60Y 2306/05* (2013.01); *B62D 21/11* (2013.01); *Y02T 10/6221* (2013.01); *Y02T 10/6243* (2013.01); *Y02T 10/6265* (2013.01); *Y02T 10/7258* (2013.01)

(56) References Cited

U.S. PATENT DOCUMENTS

| | | | | |
|---|---|---|---|---|
| 2011/0012447 A1* | 1/2011 | Himmelmann | | 310/54 |
| 2011/0148229 A1* | 6/2011 | Esse | | 310/54 |
| 2012/0091836 A1* | 4/2012 | Hayashi et al. | | 310/54 |
| 2012/0118652 A1* | 5/2012 | Yamamoto et al. | | 180/65.6 |
| 2012/0271496 A1* | 10/2012 | Yamamoto | | 701/22 |

FOREIGN PATENT DOCUMENTS

| | | |
|---|---|---|
| JP | 06-081929 A | 3/1994 |
| JP | 06-098417 A | 4/1994 |
| JP | 11-252714 A | 9/1999 |
| JP | 2001-003954 A | 1/2001 |
| JP | 2002-120575 A | 4/2002 |
| JP | 2008-141864 A | 6/2008 |
| JP | 2013-013195 A | 1/2013 |
| WO | 2010/113707 A1 | 10/2010 |
| WO | 2011/013829 A1 | 2/2011 |

OTHER PUBLICATIONS

Japanese Office Action dated Oct. 7, 2014, issued in corresponding JP application No. 2013-217778 (3 pages).

Extended European Search Report dated Mar. 31, 2015, issued in corresponding EP Patent Application No. 12796738.8 (11pages).

International Search Report of PCT/JP2012/064583, mailing date of Sep. 11, 2012.

Office Action dated Jul. 27, 2015, issued in counterpart Chinese Patent Application No. 201280027449.6, with partial English translation (9 pages).

* cited by examiner

VEHICLE DRIVING DEVICE

TECHNICAL FIELD

The present invention relates to a vehicle driving device, and more specifically relates to a vehicle driving device that performs at least one of cooling of an electric motor, lubrication thereof, cooling of a speed changer, and lubrication thereof.

BACKGROUND ART

There is disclosed a conventional vehicle driving device in an electric vehicle according to Patent Document 1, in which the device includes a pair of right and left electric motors, and a mechanical oil pump is provided between the electric motors, so that oil is supplied to an oil passage inside a driving shaft to lubricate a torque transmission system; in addition, a motor for traveling is cooled by an electric oil pump that is provided additionally. The mechanical oil pump defines, with a partition wall of a case and a pump cover, a pump chamber in which a rotator is contained, and rotates by driving the electric motors.

PRIOR ART REFERENCE

Patent Document

Patent Document 1: JP-A-6-098417

SUMMARY OF THE INVENTION

Problems to be Solved by the Invention

In the electric vehicle according to Patent Document 1, oil from the mechanical oil pump is directly supplied to the oil passage inside the driving shaft, and therefore, heat dissipation of oil is insufficient, making it necessary to take measures such as providing of an additional oil cooler. No specific location of the electric oil pump is mentioned, and oil cooled by using the cooler is supplied to the motor for traveling. Since the pump chamber of the mechanical oil pump is defined by the partition wall of the case and the pump cover, pump assembly workability still has room for improvement.

The present invention has been made in view of the above-described problems, and its object is to provide a vehicle driving device capable of enabling sufficient heat dissipation of a liquid medium with a compact structure, thus making it possible to suitably cool the liquid medium.

Solution to the Problems

To achieve the above object, according to a first aspect of the present invention a vehicle driving device (e.g., a rear wheel driving device 1 according to an after-mentioned embodiment) is provided, including:
- a first electric motor and a second electric motor (e.g., an electric motor 2A and an electric motor 2B according to the after-mentioned embodiment), which are disposed next to each other;
- a liquid medium supply device (e.g., an electric oil pump 70 according to the after-mentioned embodiment) disposed between one end (e.g., one end E1 according to the after-mentioned embodiment) which is one end of the first electric motor opposite to the second electric motor and the other end (e.g., the other end E2 according to the after-mentioned embodiment) which is one end of the second electric motor opposite to the first electric motor in an aligned direction of the first and second electric motors, the liquid medium supply device being configured to supply a liquid medium to portions to be cooled/lubricated, which are at least one of portions of the first and second electric motors to be cooled (e.g., a portion A1 or B1 to be cooled in the after-mentioned embodiment) and portions of the first and second electric motors to be lubricated (e.g., a portion A2 or B2 to be lubricated in the after-mentioned embodiment);
- a first cooling/lubrication flow passage (e.g., a first electric motor cooling flow passage 120A and a first electric motor lubrication flow passage 121A according to the after-mentioned embodiment) through which the liquid medium is supplied from the liquid medium supply device to the portion of the first electric motor to be cooled/lubricated via a region outward of the one end of the first electric motor; and
- a second cooling/lubrication flow passage (e.g., a second electric motor cooling flow passage 120B and a second electric motor lubrication flow passage 121B according to the after-mentioned embodiment) through which the liquid medium is supplied from the liquid medium supply device to the portion of the second electric motor to be cooled/lubricated via a region outward of the other end of the second electric motor.

A second aspect of the present invention based on the first aspect described above, provides the vehicle driving device, wherein the liquid medium supply device is disposed to intersect a virtual plane (e.g., a virtual plane P according to the after-mentioned embodiment) where the virtual plane is orthogonal to the aligned direction of the first and second electric motors and is equidistant from the first and second electric motors.

A third aspect of the present invention, based on the first or second aspect described above, provides the vehicle driving device,
wherein the first and second electric motors have the same diameter, and
wherein the first and second electric motors are disposed in mirror symmetry.

A fourth aspect of the present invention, based on any one of the first, second and third aspects described above, provides the vehicle driving device,
wherein the device further includes a case (e.g., a case 11 according to the after-mentioned embodiment) which accommodates the first and second electric motors, and
wherein at least a portion of each of the first and second cooling/lubrication flow passages is provided in the case.

A fifth aspect of the present invention, based on the fourth aspect described above, provides the vehicle driving device,
wherein at least a portion of each of the first and second cooling/lubrication flow passages (e.g., a front vertical oil passage 109, and front horizontal oil passages 110A and 110B according to the after-mentioned embodiment) is defined by an outer wall surface (e.g., outer wall surfaces 11A1, 11B1 and 11M1 according to the after-mentioned embodiment) of the case which is directed toward a vehicle front side.

A sixth aspect of the present invention, based on any one of the first five aspects described above, provides the vehicle driving device,
wherein the liquid medium supply device is driven by an additional electric motor (e.g., an additional electric motor 90 according to the after-mentioned embodiment) different from the first and second electric motors.

A seventh aspect of the present invention, based on any one of the first six aspects described above, provides the vehicle driving device, wherein the first electric motor drives a left wheel (e.g., a left rear wheel LWr according to the after-mentioned embodiment) of a vehicle, and wherein the second electric motor drives a right wheel (e.g., a right rear wheel RWr according to the after-mentioned embodiment) of the vehicle.

An eighth aspect of the present invention, based on any one of the first three aspects described above, provides the vehicle driving device, wherein the device includes a case (e.g., the case 11 according to the after-mentioned embodiment) which accommodates the first electric motor and includes a reservoir (e.g., a strainer containing chamber 105 according to the after-mentioned embodiment) for reserving the liquid medium, and the first cooling/lubrication flow passages, wherein the liquid medium supply device discharges the liquid medium sucked from the reservoir and supplies, via the first cooling/lubrication flow passages, the liquid medium to the portion of the first electric motor to be cooled/lubricated, wherein the device further includes a separate member (e.g., a lid member 72 according to the after-mentioned embodiment) which is detachably provided to the case and on which the liquid medium supply device is provided, wherein the case includes an opening (e.g., a front opening 105a according to the after-mentioned embodiment) opened outward, and wherein in an attached state where a separate member fixation portion (e.g., a lid member fixation portion 105b according to the after-mentioned embodiment) of the case and a case fixation portion (e.g., a case fixation portion 72a according to the after-mentioned embodiment) of the separate member are fixed to each other, the opening of the case is closed by the separate member, and a discharge-side flow passage (e.g., an oil discharge passage 95 according to the after-mentioned embodiment) of the liquid medium supply device, which is provided on the separate member, and the first cooling/lubrication flow passage of the case are connected to each other.

A ninth aspect of the present invention, based on the eigth aspect described above, provides the vehicle driving device, wherein in the attached state, a connection between the discharge-side flow passage and the first cooling/lubrication flow passages (e.g., a connection between an outlet pipe 97b and a cooling/lubrication port 108b in the after-mentioned embodiment) is located inwardly from an outer edge of the opening.

A tenth aspect of the present invention, based on the eighth or ninth aspect described above, provides the vehicle driving device, wherein at least a portion of the opening is defined at a position overlapping with the reservoir, and wherein the separate member constitutes a wall surface of the reservoir in the attached state.

An eleventh aspect of the present invention, based on the ninth or tenth aspect described above, provides the vehicle driving device, wherein the connection is provided inside the case and separated from the separate member fixation portion of the case in an attachment direction, and wherein in a separation space (e.g., a separation space D according to the after-mentioned embodiment) provided between the connection and the separate member fixation portion in the attachment direction, a valve means (e.g., a low pressure oil passage switching valve 73, a brake oil passage switching valve 74 and a relief valve 84 according to the after-mentioned embodiment) is provided for switching a flow passage interposed in the first cooling/lubrication flow passage.

A twelfth aspect of the present invention, based on any one of the eighth through eleventh aspects described above, provides the vehicle driving device, wherein a suction-side flow passage (e.g., an oil suction passage 94 according to the after-mentioned embodiment) through which the reservoir and the liquid medium supply device are communicated with each other is extended toward the case beyond the case fixation portion of the separate member, and wherein a suction port of the suction-side flow passage is located inside the reservoir in the attached state.

A thirteenth aspect of the present invention, based on any one of the eighth through twelfth aspects described above, provides the vehicle driving device, wherein a suction-side flow passage through which the reservoir and the liquid medium supply device are communicated with each other is provided by the separate member.

A fourteenth aspect of the present invention, based on the thirteenth aspect described above, provides the vehicle driving device, wherein the suction-side flow passage, through which the reservoir and the liquid medium supply device are communicated with each other, is provided by the separate member, and an additional separate member (e.g., a strainer 71 according to the after-mentioned embodiment) detachably fixed to the separate member, and wherein the additional separate member is fixed only to the separate member.

A fifteenth aspect of the present invention, based on any one of twelfth through fourteenth aspects described above, provides the vehicle driving device, wherein the suction-side flow passage is provided so as to be located within a parallel projection of an outer edge of the case fixation portion of the separate member.

A sixteenth aspect of the present invention, based on any one of the twelfth through fifteenth aspects described above, provides the vehicle driving device, wherein the suction-side flow passage is provided with a filter member (e.g., the strainer 71 according to the after-mentioned embodiment) for filtering the liquid medium.

A seventeenth aspect of the present invention, based on any one of the eighth through sixteenth aspects described above, provides the vehicle driving device, wherein the device includes a hydraulic engagement/disengagement means (e.g., a hydraulic brake 60 according to the after-mentioned embodiment) which is disposed on a power transmission path between the electric motor and a wheel of a vehicle (e.g., the rear wheels LWr and RWr according to the after-mentioned embodiment) and configured to transmit/cut off a power, wherein the case includes a hydraulic passage (e.g., a brake oil passage 77 according to the after-mentioned embodiment) through which the liquid medium supply device and a hydraulic chamber (e.g., an operation chamber S according to the after-mentioned embodiment) of the hydraulic engagement/disengagement means are communicated with each other, and wherein the liquid medium supply device supplies the liquid medium to the hydraulic chamber of the hydraulic engagement/disengagement means via the hydraulic passage.

An eighteenth aspect of the present invention based on the seventeenth aspect described above, provides the vehicle driving device, wherein in the attached state, the discharge-side flow passage provided in the separate member and the hydraulic passage of the case are connected to each other.

A nineteenth aspect of the present invention based on the eighteenth aspect described above provides the vehicle driving device, wherein in the attached state, a connection between the discharge-side flow passage and the hydraulic passage (e.g., a connection between an outlet pipe 97a and an operation chamber port 108a in the after-mentioned embodiment) is located inward from an outer edge of the opening.

A twentieth aspect of the present invention based on any one of the first, second, and third aspects described above, provides the vehicle driving device, wherein the device includes a case (e.g., the case 11 according to the after-mentioned embodiment) which accommodates the first electric motor and includes a reservoir (e.g., the strainer containing chamber 105 according to the after-mentioned embodiment) for reserving the liquid medium, wherein the liquid medium supply device discharges the liquid medium sucked from the reservoir and supplies the liquid medium to the portion of the first electric motor to be cooled/lubricated, wherein the device further includes a separate member (e.g., the lid member 72 according to the after-mentioned embodiment) which is detachably provided to the case and on which the liquid medium supply device is provided, wherein the case includes an opening (e.g., the front opening 105a according to the after-mentioned embodiment) which is opened outward, wherein at least a portion of the opening is located to overlap with the reservoir, and wherein in an attached state where a separate member fixation portion (e.g., the lid member fixation portion 105b according to the after-mentioned embodiment) of the case and a case fixation portion (e.g., the case fixation portion 72a according to the after-mentioned embodiment) of the separate member are fixed to each other, the opening of the case is closed by the separate member, and the separate member constitutes a wall surface of the reservoir.

A twenty first aspect of the present invention provides a vehicle driving device (e.g., the rear wheel driving device 1 according to the after-mentioned embodiment) including:

an electric motor (e.g., the electric motor 2A or 2B according to the after-mentioned embodiment) and a speed changer (e.g., a planetary gear type speed reducer 12A or 12B according to the after-mentioned embodiment) disposed next to each other;

a liquid medium supply device disposed at one side of the electric motor which is directed toward the speed changer in an aligned direction of the electric motor and the speed changer, the liquid medium supply device being configured to supply a liquid medium to a portion of the speed changer to be lubricated; and a lubrication flow passage (e.g., a first or second planetary gear type speed reducer lubrication flow passage 122A or 122B according to the after-mentioned embodiment) through which the liquid medium is supplied from the liquid medium supply device to the portion of the speed changer to be lubricated (e.g., a portion A3 or B3 of the first or second planetary gear type speed reducer to be lubricated) via a region located on the other side of the electric motor which is opposite to the speed changer.

A twenty second aspect of the present invention based on the twenty first aspect described above, provides the vehicle driving device, wherein the device further includes:

a wheel (e.g., the rear wheel LWr or RWr according to the after-mentioned embodiment) located on the other side of the electric motor; and a driving shaft (e.g., an axle 10A or 10B according to the after-mentioned embodiment) located closer to the wheel than the speed changer on a power transmission path between the electric motor and the wheel, and wherein the driving shaft passes through the electric motor and extends from both ends of the electric motor.

A twenty third aspect of the present invention based on the twenty second aspect described above provides the vehicle driving device, wherein an axial hole (e.g., an axial hole 114A or 114B according to the after-mentioned embodiment) extending along an axial direction of the electric motor is provided in the driving shaft, and wherein the lubrication flow passage is formed such that the liquid medium supply device is connected to the axial hole on the other side of the electric motor, and the portion of the speed changer to be lubricated is connected to the axial hole on the one side of the electric motor.

A twenty fourth aspect of the present invention based on any one of the twenty first through twenty third aspects described above, provides the vehicle driving device, wherein the liquid medium supply device and the speed changer overlap with each other in the axial direction of the electric motor.

A twenty fifth aspect of the present invention based on the twenty first aspect described above, provides the vehicle driving device, wherein the device further includes:

a case (e.g., the case 11 according to the after-mentioned embodiment) which accommodates the electric motor and the speed changer; and a driving shaft, wherein a power from the electric motor is transmitted to the driving shaft via the speed changer, and wherein the lubrication flow passage includes an intra-case lubrication flow passage (e.g., the front vertical oil passage 109, the front horizontal oil passage 110A or 110B, the front-rear horizontal oil passage 111A or 111B, and the lubrication oil passage 113A or 113B) provided in the case, and the liquid medium discharged from the liquid medium supply device passes through the intra-case lubrication flow passage from the one side of the electric motor, and flows via an inner region of the driving shaft from the other side of the electric motor, so as to lubricate the portion of the speed changer to be lubricated.

A twenty sixth aspect of the present invention based on the twenty fifth aspect described above, provides the vehicle driving device, wherein at least a portion of the intra-case lubrication flow passage (e.g., the front vertical oil passage 109 and the front horizontal oil passage 110A or 110B according to the after-mentioned embodiment) is defined by an outer wall surface (e.g., an outer wall surface 11A1 or 11B1 and an outer wall surface 11M1 according to the after-mentioned embodiment) of the case which faces toward a vehicle front.

A twenty seventh aspect of the present invention based on the twenty first aspect described above, provides the vehicle driving device, wherein the device includes a case (e.g., the case 11 according to the after-mentioned embodiment) which accommodates the speed changer and includes a reservoir (e.g., the strainer containing chamber 105 according to the after-mentioned embodiment) for reserving the liquid medium, and the lubrication flow passage, wherein the liquid medium supply device discharges the liquid medium sucked from the reservoir and supplies, via the lubrication flow passage, the liquid medium to the portion to be lubricated, wherein the device further includes a separate member (e.g., the lid member 72 according to the after-mentioned embodiment) which is detachably provided to the case and on which the liquid medium supply device is provided, wherein the case includes an opening (e.g., the front opening 105a according to the after-mentioned embodiment) which is opened outward, and wherein in an attached state where a separate member fixation portion (e.g., the lid member fixation portion 105b according to the after-mentioned embodiment) of the case and a case fixation portion (e.g., the case fixation portion 72a according to the after-mentioned embodiment) of the separate member are fixed to each other, the opening of the case is closed by the separate member, and a discharge-side flow passage (e.g., the oil discharge passage 95 according to the after-mentioned embodiment) of the liquid medium supply device, which is provided in the separate member, and the lubrication flow passage of the case are connected to each other.

A twenty eighth aspect of the present invention based on the twenty first aspect described above, provides the vehicle driving device, wherein the device includes a case (e.g., the case 11 according to the after-mentioned embodiment) which accommodates the speed changer and includes a reservoir (e.g., the strainer containing chamber 105 according to the after-mentioned embodiment) for reserving the liquid medium, wherein the liquid medium supply device discharges the liquid medium sucked from the reservoir and supplies the liquid medium to the portion to be lubricated, wherein the device further includes a separate member (e.g., the lid member 72 according to the after-mentioned embodiment) which is detachably provided to the case and on which the liquid medium supply device is provided, wherein the case includes an opening (e.g., the front opening 105a according to the after-mentioned embodiment) which is opened outward, wherein at least a portion of the opening is provided to overlap with the reservoir, and wherein in an attached state where a separate member fixation portion (e.g., the lid member fixation portion 105b according to the after-mentioned embodiment) of the case and a case fixation portion (e.g., the case fixation portion 72a according to the after-mentioned embodiment) of the separate member are fixed to each other, the opening of the case is closed by the separate member, and the separate member constitutes a wall surface of the reservoir.

Effects of the Invention

According to the first aspect of the present invention, the liquid medium supply device is disposed between the one end of the first electric motor and the other end of the second electric motor, thus enabling the driving device to be made compact in the direction in which the first and second electric motors are aligned. The first cooling/lubrication flow passage extends via a region outward of the one end of the first electric motor, and the second cooling/lubrication flow passage extends via a region outward of the other end of the second electric motor. Hence, a sufficient length can be ensured for each of the first and second cooling/lubrication flow passages, enabling suitable cooling of the liquid medium; thus, cooling performance is enhanced, and favorable lubrication is carried out by utilizing a sufficient viscosity of the liquid medium resulting from temperature reduction.

According to the second aspect of the present invention, the length of the first cooling/lubrication flow passage and the length of the second cooling/lubrication flow passage can be equal to each other, so that pressure loss is also uniformized and the liquid medium can be equally supplied to the first and second electric motors.

According to the third aspect of the present invention, the length of the first cooling/lubrication flow passage and the length of the second cooling/lubrication flow passage can be further equalized with each other, so that pressure loss is also further uniformized and the liquid medium can be equally supplied to the first and second electric motors.

According to the fourth aspect of the present invention, the first and second cooling/lubrication flow passages can be provided without the use of components such as hoses, thus making it possible to reduce the number of components and to reduce a damage which is given to the flow passages.

According to the fifth aspect of the present invention, the liquid medium in the first and second cooling/lubrication flow passages can be more efficiently cooled through the case by wind caused by traveling.

According to the sixth aspect of the present invention of, the liquid medium supply device having increased location flexibility can be disposed suitably.

According to the seventh aspect of the present invention, the left rear wheel and the right rear wheel can be driven independently.

According to the eighth aspect of the present invention, when the separate member at which the liquid medium supply device is disposed is fixed to the case, the opening of the case is closed, and at the same time, the flow passages are connected to each other; hence, assembly workability of the liquid medium supply device is improved, and time required for assembly work can be reduced. Since the liquid medium supply device is disposed at the separate member attachable and detachable to and from the case, maintenance, replacement and assembly of the liquid medium supply device are facilitated.

According to the ninth aspect of the present invention, even when the liquid medium is leaked from the connection between the discharge-side flow passage and the first cooling/lubrication flow passages, the leaked liquid medium can be stored inside the case.

According to the tenth aspect of the present invention, the separate member, at which the liquid medium supply device is disposed, and the reservoir can be disposed close to each other, and the suction-side flow passage of the liquid medium supply device can be reduced in length. In a state where the separate member is detached, the wall surface of the reservoir is partially removed, thus making it possible to easily visually recognize the inside of the reservoir, and to easily perform, for example, cleaning of the reservoir.

According to the eleventh aspect of the present invention, the valve means can be disposed inside the case, and portions of the case protruded outward can be reduced.

According to the twelfth aspect of the present invention, with the separate member attached to the case, the suction port of the suction-side flow passage is disposed at a suitable position inside the reservoir in the case, and the liquid medium can be sucked therethrough with reliability.

According to the thirteenth aspect of the present invention, the suction-side flow passage and the separate member can be handled as a one-piece component, which improves attaching and detaching workability; in addition, the suction-side flow passage does not have to be provided in the case, thus making it possible to achieve structure simplification and weight reduction of the case.

According to the fourteenth aspect of the present invention, the additional separate member, by which the suction-side flow passage is provided, is attached and detached to and from the case simultaneously with attachment and detachment of the separate member thereto and therefrom, thus making it possible to easily attach and detach the additional separate member to and from the case. Since the additional separate member is attachable and detachable to and from the separate member, maintenance and replacement of the suction-side flow passage can also be easily carried out.

According to the fifteenth aspect of the present invention, when the separate member is detached, the suction-side flow passage can be easily detached without being caught by the case.

According to the sixteenth aspect of the present invention, the filter member and the separate member can be handled as a one-piece component, thus making it possible to easily carry out maintenance and replacement of the filter member, and eliminating the necessity to additionally ensure space where the filter member is to be disposed.

According to the seventeenth aspect of the present invention, the liquid medium supply device is allowed to supply the liquid medium to both of the cooling/lubrication flow passages of the case and the hydraulic chamber of the hydraulic engagement/disengagement means, resulting in simplification in structure.

According to the eighteenth aspect of the present invention, in addition to closing of the opening and connection of the cooling/lubrication flow passages, connection of the hydraulic passage is also carried out at the same time, thus improving assembly workability of the liquid medium supply device and making it possible to reduce the time required for assembly work.

According to the nineteenth aspect of the present invention, even when the liquid medium is leaked from the connection between the suction-side flow passage and the hydraulic passage, the leaked liquid medium can be stored inside the case.

According to the twentieth aspect of the present invention, the separate member, at which the liquid medium supply device is disposed, and the reservoir can be disposed close to each other, and the suction-side flow passage of the liquid medium supply device can be reduced in length. In the state where the separate member is detached, the wall surface of the reservoir is partially removed, thus making it possible to easily visually recognize the inside of the reservoir, and to easily perform, for example, cleaning of the reservoir.

According to the twenty first aspect of the present invention, since the lubrication flow passage extends via the other side defined with respect to the electric motor, a sufficient length can be ensured for the lubrication flow passage, and suitable cooling of the liquid medium is enabled, so that favorable lubrication is carried out by utilizing a sufficient viscosity of the liquid medium resulting from temperature reduction.

According to the twenty second aspect of the present invention, the driving shaft passes through the electric motor, thus making it possible to reduce the driving device in radial size.

According to the twenty third aspect of the present invention, it is possible to provide the lubrication flow passage while reducing portions to be provided in the case, thus enabling structure simplification of the case.

According to the twenty fourth aspect of the present invention, the liquid medium supply device and the speed changer overlap with each other in the axial direction, and thus the resulting apparatus can be made compact in the axial direction.

According to the twenty fifth aspect of the present invention, the lubrication flow passage can be provided without the use of a component such as a hose, thus making it possible to reduce the number of components and to reduce damage which is given to the flow passage.

According to the twenty sixth aspect of the present invention, the liquid medium in the lubrication flow passage can be more efficiently cooled through the case by wind caused by traveling.

According to the twenty seventh aspect of the present invention, when the separate member at which the liquid medium supply device is disposed is fixed to the case, the opening of the case is closed, and at the same time, the flow passages are connected to each other; hence, assembly workability of the liquid medium supply device is improved, and the time required for assembly work can be reduced. Since the liquid medium supply device is disposed at the separate member attachable and detachable to and from the case, maintenance, replacement and assembly of the liquid medium supply device are facilitated.

According to the twenty eighth aspect of the present invention, the separate member, at which the liquid medium supply device is disposed, and the reservoir can be disposed close to each other, and the suction-side flow passage of the liquid medium supply device can be reduced in length. In the state where the separate member is detached, the wall surface of the reservoir is partially removed, thus making it possible to easily visually recognize the inside of the reservoir, and to easily perform, for example, cleaning of the reservoir.

MODE FOR CARRYING OUT THE INVENTION

Figure 1:
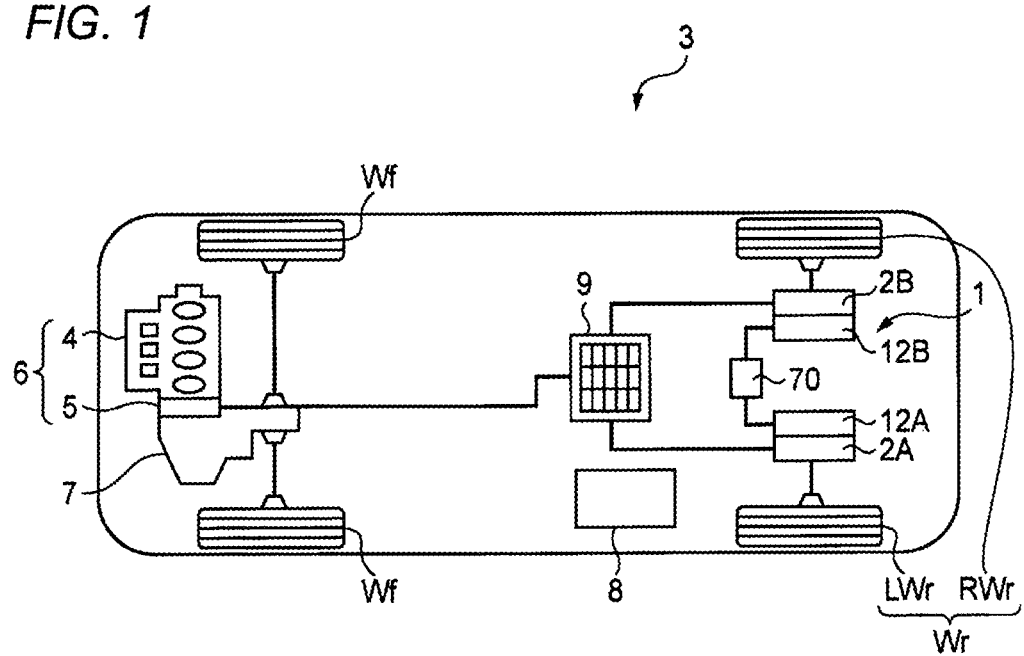
FIG. 1 is a block diagram illustrating a schematic configuration of a hybrid vehicle provided as one embodiment of a vehicle on which a vehicle driving device according to the present invention can be installed.

A vehicle driving device according to the present invention utilizes an electric motor as a driving source for driving a wheel, and is used in a vehicle having a driving system illustrated in FIG. 1, for example. The following description is based on an example in which the vehicle driving device is used to drive a rear wheel, but the vehicle driving device may alternatively be used to drive a front wheel.

A vehicle 3 illustrated in FIG. 1 is a hybrid vehicle that includes, in a vehicle front portion, a driving device 6 (hereinafter referred to as a "front wheel driving device") in which an internal combustion engine 4 and an electric motor 5 are connected in series. Power generated by the front wheel driving device 6 is transmitted to front wheels Wf via a transmission 7, while power generated by a driving device 1 (hereinafter referred to as a "rear wheel driving device") provided in a vehicle rear portion separately from the front wheel driving device 6 is transmitted to rear wheels Wr (RWr and LWr). The electric motor 5 of the front wheel driving device 6, and first and second electric motors 2A and 2B of the rear wheel driving device 1 for the rear wheels Wr are connected to a battery 9, so that electric power supply from the battery 9 and energy regeneration to the battery 9 are enabled. The reference character "8" in FIG. 1 denotes a control device for controlling the entire vehicle.

First, the vehicle driving device according to one embodiment of the present invention will be described with reference to FIGS. 2 to 10.

Figure 2:
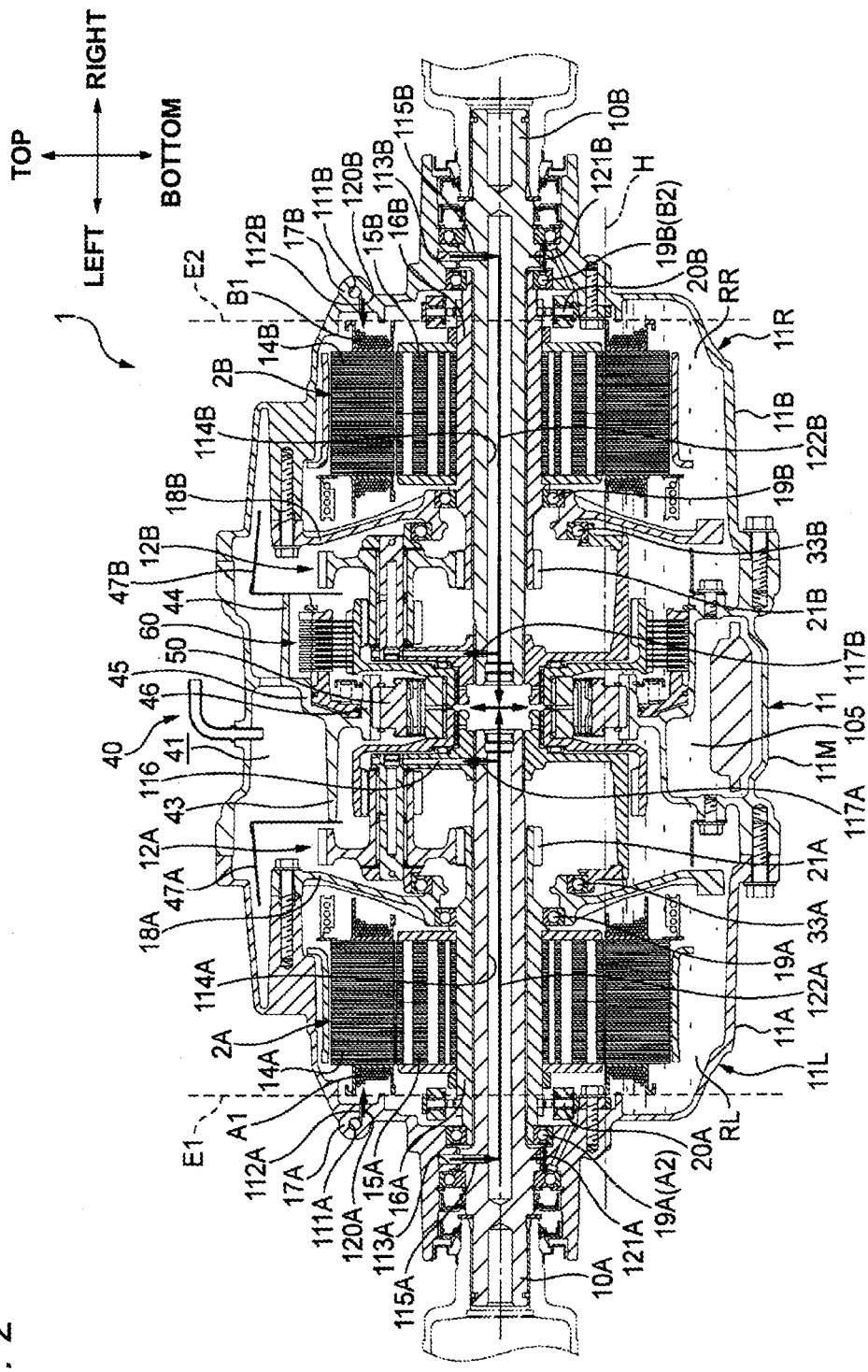
FIG. 2 is a longitudinal cross-sectional view of a rear wheel driving device according to one embodiment, taken along the line II-II illustrated in FIG. 9.
Figure 3:
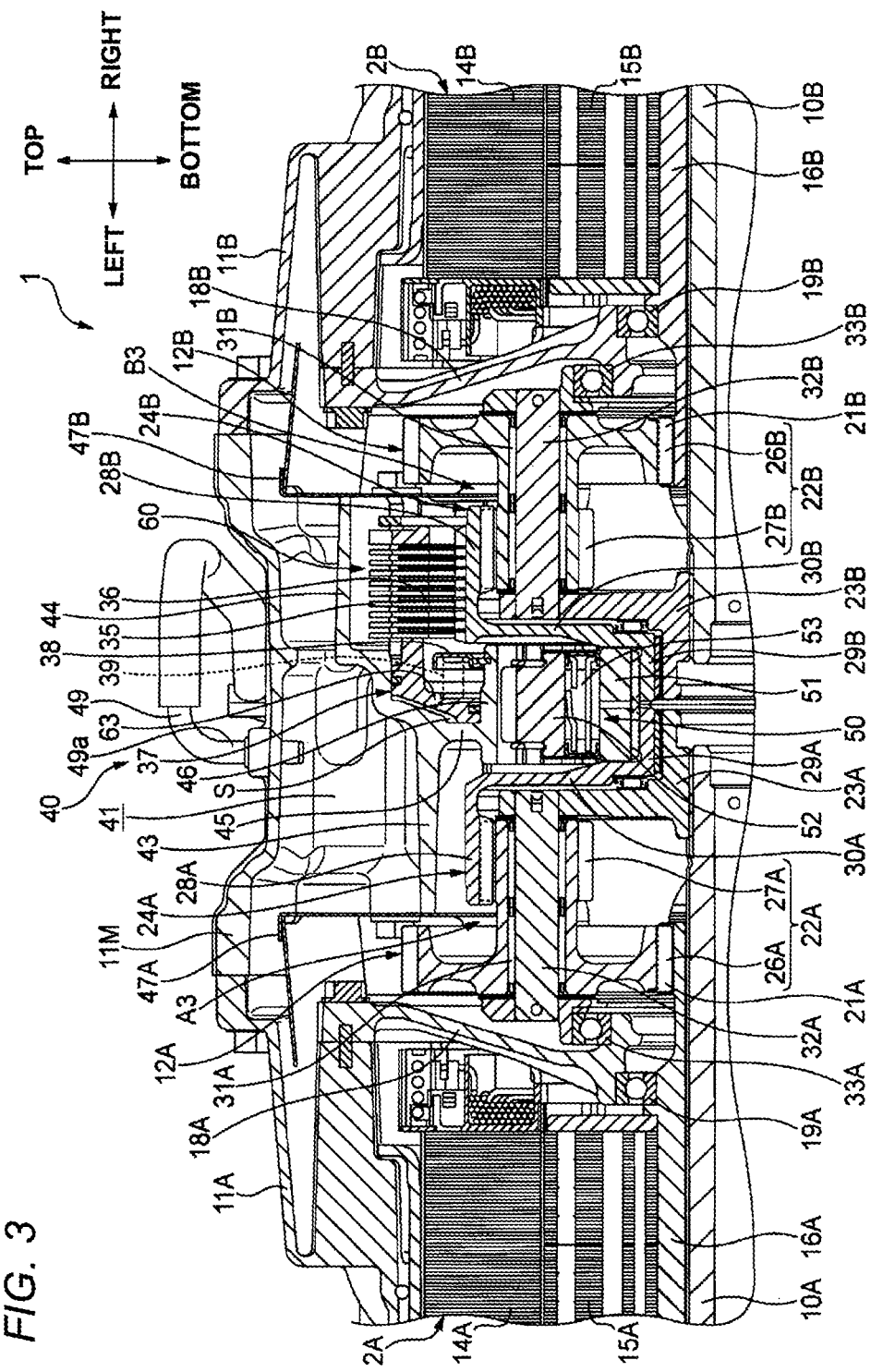
FIG. 3 is a partially enlarged upper portion of cross-sectional view of the rear wheel driving device illustrated in FIG. 2.

FIG. 2 is an overall longitudinal cross-sectional view of the rear wheel driving device 1, and FIG. 3 is a partially enlarged upper cross-sectional view of FIG. 2. Referring to FIG. 2, the reference character "11" denotes a case of the rear wheel driving device 1. The case 11 includes: a center case 11M disposed in a substantially widthwise center of the vehicle; and lateral cases 11A and 11B disposed leftward and rightward of the center case 11M, respectively, with the center case 11M sandwiched therebetween. The case 11 is formed into a substantially cylindrical shape as a whole. In the case 11, axles 10A and 10B for the rear wheels Wr, the first and second electric motors 2A and 2B for driving the axles, and first and second planetary gear type speed reducers 12A and 12B serving as first and second speed changers for reducing driving rotation of the electric motors 2A and 2B are disposed on the same axis so as to be aligned with each other. The axle 10A, the first electric motor 2A and the first planetary gear type speed reducer 12A drive and control the left rear wheel LWr. The axle 10B, the second electric motor 2B and the second planetary gear type speed reducer 12B drive and control the right rear wheel RWr. The axle 10A, first electric motor 2A and first planetary gear type speed reducer 12A, and the axle 10B, second electric motor 2B and second planetary gear type speed reducer 12B are disposed symmetrically in a vehicle width direction in the case 11. The left rear wheel LWr is located opposite to the first planetary gear type speed reducer 12A with respect to the first electric motor 2A, and the right rear wheel RWr is also located opposite to the second planetary gear type speed reducer 12B with respect to the second electric motor 2B.

Figure 4:
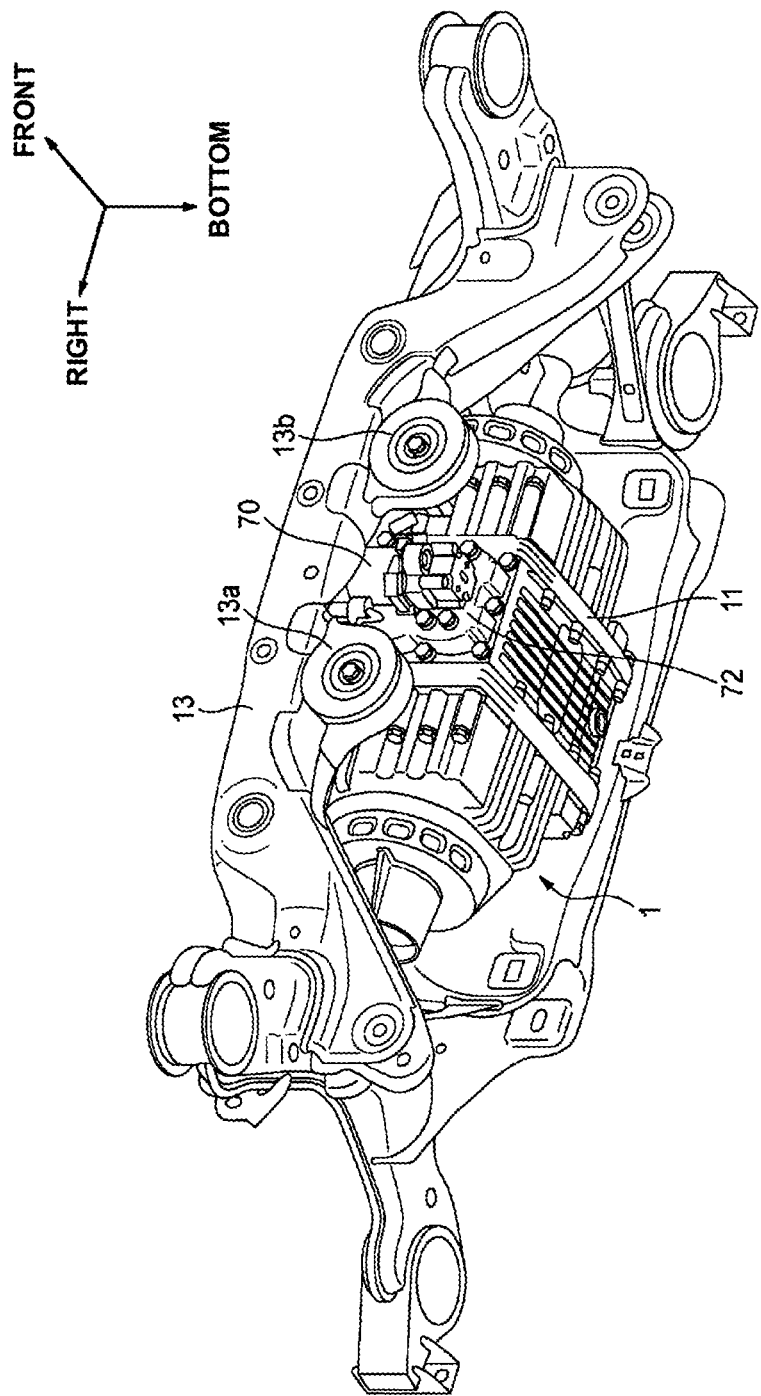
FIG. 4 is a perspective view illustrating a state in which the vehicle driving device of FIG. 1 is installed on a frame.

Partition walls 18A and 18B are provided at portions of the lateral cases 11A and 11B adjacent to the center case 11M, respectively, so as to extend radially inward. The first electric motor 2A is disposed between the lateral case 11A and the partition wall 18A, and the second electric motor 2B is disposed between the lateral case 11B and the partition wall 18B. The first and second planetary gear type speed reducers 12A and 12B are disposed in a space surrounded by the center case 11M and the partition walls 18A and 18B. As illustrated in FIG. 2, in the present embodiment, the left lateral case 11A and the center case 11M constitute a first case 11L for containing the first electric motor 2A and the first planetary gear type speed reducer 12A, and the right lateral case 11B and the center case 11M constitute a second case 11R for containing the second electric motor 2B and the second planetary gear type speed reducer 12B. The first case 11L includes a left reservoir RL for storing oil serving as a liquid medium for lubrication and/or cooling of at least one of the first electric motor 2A and a power transmission path associated thereto, and the second case 11R includes a right reservoir RR for storing oil for lubrication and/or cooling of at least one of the second electric motor 2B and a power transmission path associated thereto. As illustrated in FIG. 4, the case 11 is supported by: supporters 13a and 13b of a frame member 13 which is part of a frame serving as an outline of the vehicle 3; and a not-illustrated frame of the driving device 1. The supporters 13a and 13b are provided at right and left positions with respect to a center of the frame member 13 in the vehicle width direction. Arrows in FIGS. 2 to 10 represent positional relationships established when the rear wheel driving device 1 is installed on the vehicle.

The rear wheel driving device 1 is provided with a breather 40 through which inside and outside of the case 11 are communicated with each other, and inside air is allowed to escape to the outside via a breather chamber 41 so that the inside air does not excessively increase in temperature and pressure. The breather chamber 41 is disposed at a vertically upper position in the case 11, and includes a space defined by: an outer wall of the center case 11M; a first cylindrical wall 43 provided inside the center case 11M so as to be extended substantially horizontally toward the left lateral case 11A; a second cylindrical wall 44 extended substantially horizontally toward the right lateral case 11B; a right-left partition wall 45 through which inner ends of the first and second cylindrical walls 43 and 44 are connected to each other; a baffle plate 47A attached so as to be abutted against a tip portion of the first cylindrical wall 43 located toward the left lateral case 11A; and a baffle plate 47B attached so as to be abutted against a tip portion of the second cylindrical wall 44 located toward the right lateral case 11B.

The first and second cylindrical walls 43 and 44 and the right-left partition wall 45 which constitute a lower surface of the breather chamber 41 are arranged as follows. The first cylindrical wall 43 is located radially inward of the second cylindrical wall 44. The right-left partition wall 45 is extended from the inner end of the second cylindrical wall 44 to the inner end of the first cylindrical wall 43 while being reduced in diameter and bent, and is further extended radially inward to reach a third cylindrical wall 46 that is extended substantially horizontally. The third cylindrical wall 46 is located inward of outer ends of the first and second cylindrical walls 43 and 44 and located at a substantially center region thereof.

The baffle plates 47A and 47B are fixed to the center case 11M so that a space between the first cylindrical wall 43 and the outer wall of the center case 11M or a space between the second cylindrical wall 44 and the outer wall of the center case 11M is defined from the planetary gear type speed reducer 12A or the planetary gear type speed reducer 12B.

In the center case 11M, an external communication passage 49 through which the breather chamber 41 and the outside are communicated with each other is connected to a vertical upper surface of the breather chamber 41. An end 49a of the external communication passage 49 adjacent to the breather chamber is disposed so as to face vertically downward. Accordingly, discharge of oil to the outside through the external communication passage 49 is suppressed.

In the first and second electric motors 2A and 2B, stators 14A and 14B are fixed to the lateral cases 11A and 11B, respectively, and annular rotors 15A and 15B are rotatably disposed inward of the stators 14A and 14B, respectively. Cylindrical shafts 16A and 16B surrounding outer peripheries of the axles 10A and 10B are connected to inner peripheral portions of the rotors 15A and 15B, respectively. The cylindrical shafts 16A and 16B are supported by end walls 17A and 17B of the lateral cases 11A and 11B and the partition walls 18A and 18B via bearings 19A and 19B so that the cylindrical shafts 16A and 16B can rotate coaxially with respect to the axles 10A and 10B, respectively. The end walls 17A and 17B located at outer peripheries of ends of the cylindrical shafts 16A and 16B are provided with resolvers 20A and 20B for feeding rotational position information of the rotors 15A and 15B back to a controller (not illustrated) of the electric motors 2A and 2B. The first and second electric motors 2A and 2B including the stators 14A and 14B and the rotors 15A and 15B have the same diameter, and the first and second electric motors 2A and 2B are disposed in mirror symmetry. The axle 10A and the cylindrical shaft 16A pass through the first electric motor 2A to extend from ends of the first electric motor 2A. The axle 10B and the cylindrical shaft 16B also pass through the second electric motor 2B to extend from ends of the second electric motor 2B.

The first and second planetary gear type speed reducers 12A and 12B include sun gears 21A and 21B, a plurality of planetary gears 22A and 22B that intermesh with the sun gears 21, planetary carriers 23A and 23B for supporting the planetary gears 22A and 22B, respectively, and ring gears 24A and 24B that intermesh with outer peripheral portions of the planetary gears 22A and 22B, respectively, so that driving forces generated by the electric motors 2A and 2B are inputted from the sun gears 21A and 21B, respectively, and reduced driving forces are outputted to the axles 10A and 10B through the planetary carriers 23A and 23B, respectively.

The sun gears 21A and 21B are formed integrally with the cylindrical shafts 16A and 16B, respectively. The planetary gears 22A and 22B are double pinions including large-diameter first pinions 26A and 26B that directly intermesh with the sun gears 21A and 21B, and second pinions 27A and 27B whose diameters are smaller than those of the first pinions 26A and 26B, and are integrally formed in a state where the first pinions 26A and 26B and the second pinions 27A and 27B are coaxially and axially offset. The planetary gears 22A and 22B are supported by pinion shafts 32A and 32B of the planetary carriers 23A and 23B via needle bearings 31A and 31B, respectively. Axial inner ends of the planetary carriers 23A and 23B are extended radially inward and spline-fitted to the axles 10A and 10B; thus, the planetary carriers 23A and 23B are supported by the axles 10A and 10B so as to be rotatable together therewith. In addition, the planetary carriers 23A and 23B are supported by the partition walls 18A and 18B via bearings 33A and 33B, respectively.

The ring gears 24A and 24B include: gear portions 28A and 28B whose inner peripheral surfaces intermesh with the small-diameter second pinions 27A and 27B, respectively; small-diameter portions 29A and 29B having diameters smaller than those of the gear portions 28A and 28B and disposed to face each other at intermediate positions in the case 11; and connection portions 30A and 30B through which axial inner ends of the gear portions 28A and 28B and axial outer ends of the small-diameter portions 29A and 29B are radially connected to each other.

The gear portions 28A and 28B axially face each other, with the third cylindrical wall 46 at an inner-diameter end of the right-left partition wall 45 of the center case 11M sandwiched therebetween. Outer peripheral surfaces of the small-diameter portions 29A and 29B are spline-fitted to an inner race 51 of a one-way clutch 50 which will be described later, and the ring gears 24A and 24B are connected to each other so as to be rotated together with the inner race 51 of the one-way clutch 50.

At a position located adjacent to the planetary gear type speed reducer 12B and between the second cylindrical wall 44 of the center case 11M of the case 11 and the gear portion 28B of the ring gear 24B, a hydraulic brake 60 constituting a braking means for the ring gear 24B is disposed so as to be radially overlapped with the first pinion 26B, and axially overlapped with the second pinion 27B. In the hydraulic brake 60, a plurality of fixation plates 35 spline-fitted to an inner peripheral surface of the second cylindrical wall 44, and a plurality of rotation plates 36 spline-fitted to an outer peripheral surface of the gear portion 28B of the ring gear 24B are axially alternately arranged, and the plates 35 and 36 are engaged and disengaged by an annular piston 37. The piston 37 is contained in an annular cylinder chamber provided between the right-left partition wall 45 of the center case 11M and the third cylindrical wall 46, and is movable forward and backward therein; moreover, at normal times, an elastic member 39 supported by a receiving seat 38 provided at an outer peripheral surface of the third cylindrical wall 46 urges the piston 37 in a direction in which the fixation plates 35 and the rotation plates 36 are disengaged.

More specifically, a space between the right-left partition wall 45 and the piston 37 is defined as an operation chamber S into which oil is directly introduced. When the pressure of the oil introduced into the operation chamber S exceeds the urging force of the elastic member 39, the piston 37 moves forward (rightward), and thus the fixation plates 35 and the rotation plates 36 are pressed against each other and engaged with each other. Conversely, when the urging force of the elastic member 39 exceeds the pressure of the oil introduced into the operation chamber S, the piston 37 moves backward (leftward), and thus the fixation plates 35 and the rotation plates 36 are separated from each other and disengaged from each other. Note that the hydraulic brake 60 is connected to an electric oil pump 70 (see FIG. 4) serving as a liquid medium supply device.

In this hydraulic brake 60, the fixation plates 35 are supported by the second cylindrical wall 44 extending from the right-left partition wall 45 of the center case 11M of the case 11, while the rotation plates 36 are supported by the gear portion 28B of the ring gear 24B; therefore, when the plates 35 and 36 are pressed against each other by the piston 37, frictional engagement between the plates 35 and 36 exerts a braking force on the ring gear 24B to cause fixation thereof. When the engagement of the plates 35 and 36 by the piston 37 is released from this state, the ring gear 24B is allowed to rotate freely. Note that the ring gears 24A and 24B are connected to each other as mentioned above; therefore, when the hydraulic brake 60 is engaged, a braking force is also exerted on the ring gear 24A to cause fixation thereof, and when the hydraulic brake 60 is disengaged, the ring gear 24A is also allowed to rotate freely.

A space is also ensured between the connection portions 30A and 30B of the ring gears 24A and 24B axially facing each other. In this space, there is disposed the one-way clutch 50 that transmits power to the ring gears 24A and 24B only in one direction and prevents power from being transmitted thereto in the other direction. In the one-way clutch 50, a large number of sprags 53 are interposed between the inner race 51 and outer race 52, and the inner race 51 is adapted so as to be rotated together with the small-diameter portions 29A and 29B of the ring gears 24A and 24B since the inner race 51 is spline-fitted thereto. The third cylindrical wall 46 determines positioning of the outer race 52 and prevents rotation thereof.

The one-way clutch 50 is adapted so as to lock the rotation of the ring gears 24A and 24B by being engaged when the vehicle 3 moves forward by power generated by the electric motors 2A and 2B. More specifically, the one-way clutch 50 enters an engaged state when rotational power is inputted to the wheels Wr from the electric motors 2A and 2B in a forward direction (i.e., a rotational direction when the vehicle 3 is moved forward), and enters a non-engaged state when rotational power is inputted to the wheels Wr from the electric motors 2A and 2B in the opposite direction; furthermore, the one-way clutch 50 enters the non-engaged state when rotational power is inputted to the electric motors 2A and 2B from the wheels Wr in the forward direction, and enters the engaged state when rotational power is inputted to the electric motors 2A and 2B from the wheels Wr in the opposite direction.

As described above, in the rear wheel driving device 1 according to the present embodiment, the one-way clutch 50 and the hydraulic brake 60 are provided in parallel on the power transmission path between the electric motors 2A and 2B and the wheels Wr. Note that the hydraulic brake 60 is controlled to enter a disengaged state, a slightly engaged state or an engaged state by the pressure of oil supplied from the oil pump 70 in accordance with a traveling state of the vehicle or the engaged or non-engaged state of the one-way clutch 50. For example, when the vehicle 3 moves forward by power driving of the electric motors 2A and 2B (i.e., when the vehicle travels at a low or intermediate speed), the one-way clutch 50 is engaged, thus bringing about a power transmittable state; however, even when the input of the forward rotational power from the electric motors 2A and 2B is temporarily decreased to cause the one-way clutch 50 to enter the non-engaged state, the hydraulic brake 60 is controlled to enter the slightly engaged state, thereby preventing the electric motors 2A and 2B and the wheels Wr from entering a state in which power cannot be transmitted therebetween. When the vehicle 3 moves forward by power driving of the internal combustion engine 4 and/or the electric motor 5 (i.e., when the vehicle travels at a high speed), the one-way clutch 50 enters the non-engaged state, and furthermore, the hydraulic brake is controlled to enter the disengaged state, thus preventing excessive rotation of the electric motors 2A and 2B. When the vehicle 3 moves backward or regeneration is performed, the one-way clutch 50 enters the non-engaged state, and therefore, the hydraulic brake 60 is controlled to enter the engaged state; thus, rotational power is outputted to the wheels Wr from the electric motors 2A and 2B in the opposite direction, or rotational power is inputted to the electric motors 2A and 2B from the wheels Wr in the forward direction.

Figure 5:
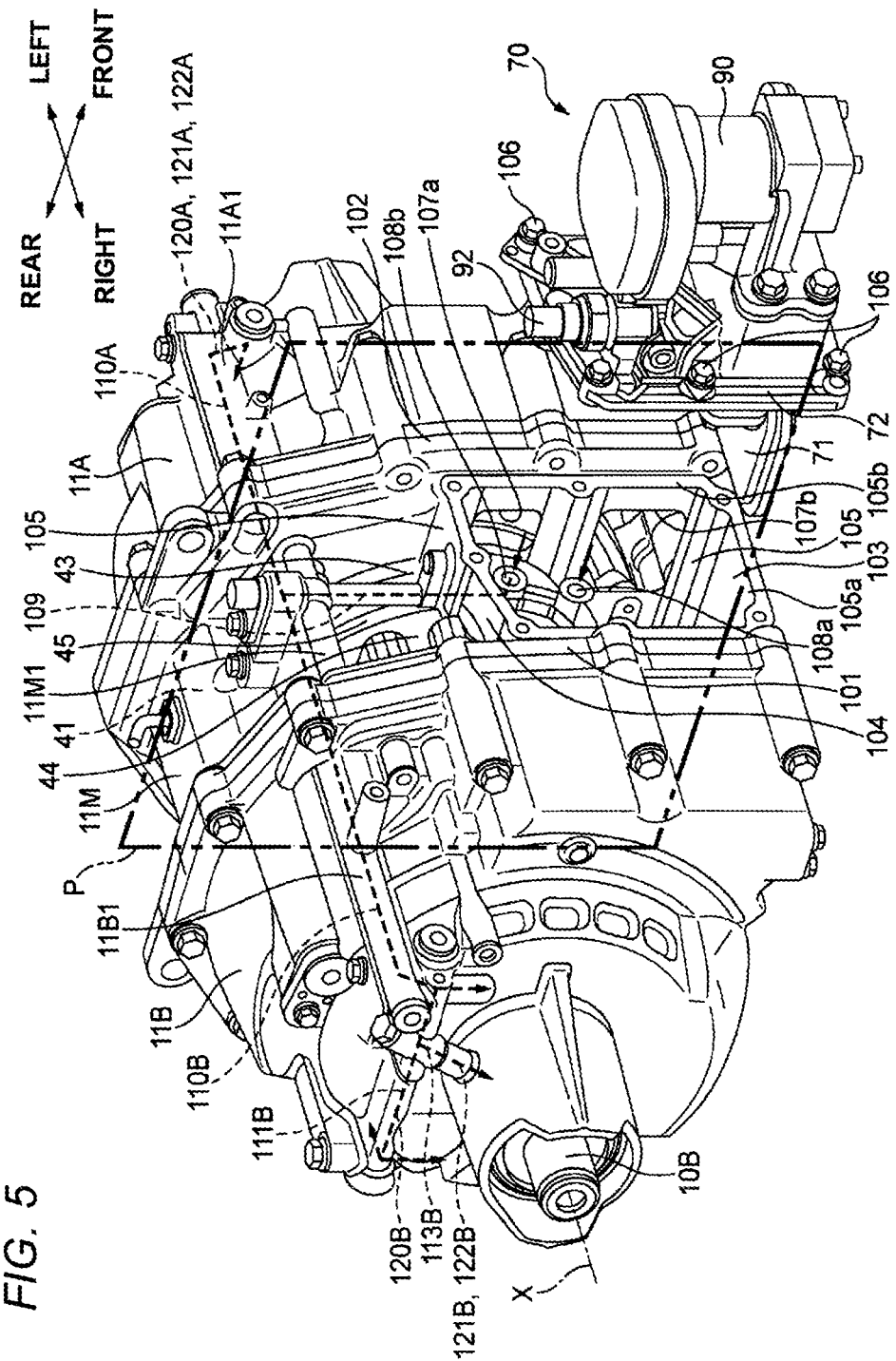
FIG. 5 is an external perspective view of the rear wheel driving device from which an electric oil pump is removed.
Figure 8:
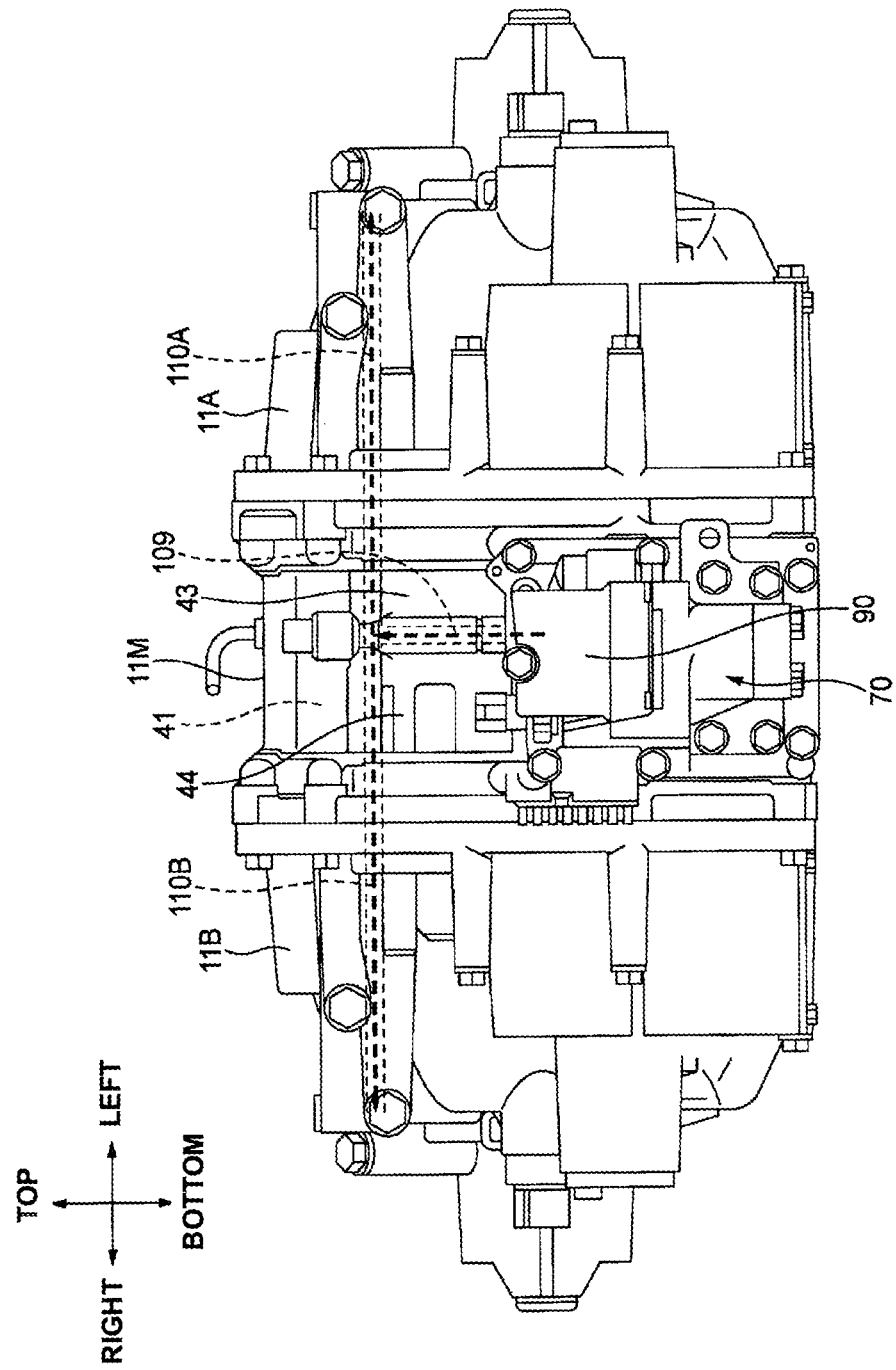
FIG. 8 is a front view of the rear wheel driving device, which schematically illustrates how oil flows.

As illustrated in FIGS. 5 and 8, outer peripheral surfaces of the first and second cylindrical walls 43 and 44 and the right-left partition wall 45 of the center case 11M are exposed to the outside except at a region where the breather chamber 41 is defined. The outer peripheral surfaces of the first and second cylindrical walls 43 and 44 and the right-left partition wall 45 are provided with a pair of projected portions 101 and 102 projected radially from axial ends thereof.

Figure 6:
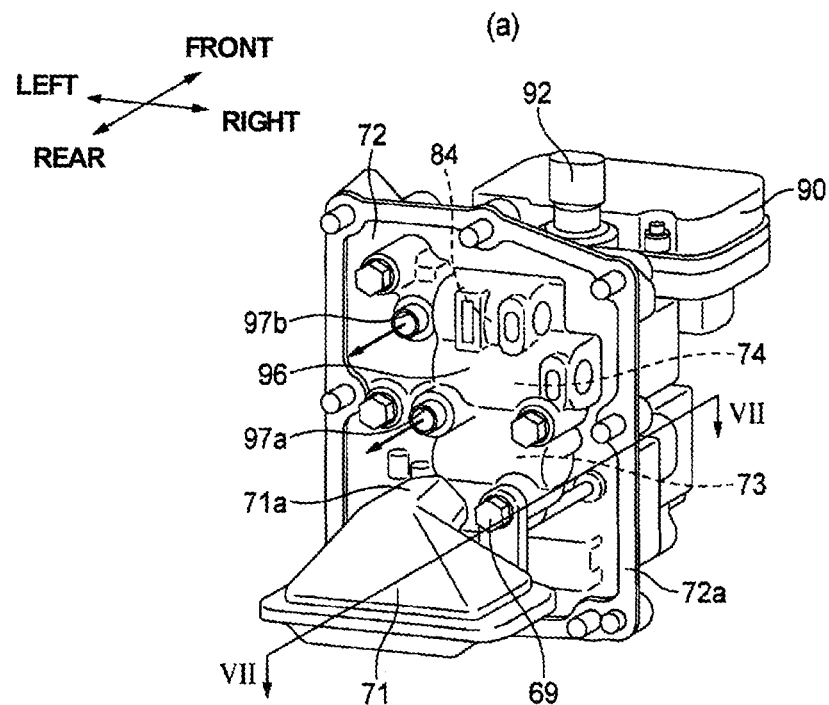
FIG. 6(a) is a perspective view of a lid member to which the electric oil pump is attached, as viewed from inside.
FIG. 6(b) is a front view of the lid member as viewed from inside.
Figure 6:
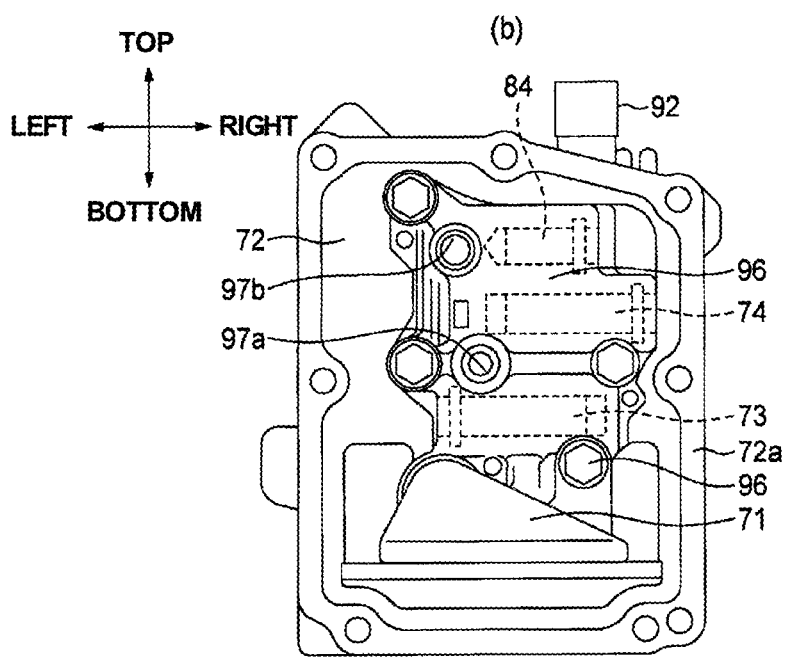

A peripheral region of the first and second cylindrical walls 43 and 44 and the right-left partition wall 45 which is located obliquely forward of and below the first and second cylindrical walls 43 and 44 and the right-left partition wall 45 is formed into a substantially rectangular tubular shape by the pair of projected portions 101 and 102, a bottom wall 103 and an upper wall 104, thus defining a strainer containing chamber 105 that contains a strainer 71 which will be described later and serves as a reservoir for storing oil. Tip surfaces of the pair of projected portions 101 and 102, bottom wall 103 and upper wall 104 which define the strainer containing chamber 105 constitute a lid member fixation portion 105b, and define an outer edge of a front opening 105a that is opened outward. A lower region of the strainer containing chamber 105 serves as a reservoir for storing oil so as to have an oil level at which lower ends of the rotors 15A and 15B of the electric motors 2A and 2B are not submerged in oil. The front opening 105a is defined at a position overlapping with the reservoir of the strainer containing chamber 105. The front opening 105a of the strainer containing chamber 105 is closed by a lid member 72 which is a separate member to which the electric oil pump 70 is attached. At a position facing the lid member fixation portion 105b of the case 11, the lid member 72 is provided with a case fixation portion 72a having a substantially rectangular end face. As illustrated in FIGS. 5 and 6, the case fixation portion 72a provided at the lid member 72 and the lid member fixation portion 105b provided at the front opening 105a of the strainer containing chamber 105 are fastened and fixed to each other with a plurality of bolts 106, thus attaching the electric oil pump 70 to the front opening 105a of the strainer containing chamber 105.

Accordingly, as illustrated in FIG. 5, the electric oil pump 70 attached to the case 11 is disposed to intersect a virtual plane P orthogonal to an axial direction of the first and second electric motors 2A and 2B and equidistant from the first and second electric motors 2A and 2B. The electric oil pump 70 is disposed at a center region (one side) which is defined with respect to the first and second electric motors 2A and 2B in the axial direction of the first and second electric motors 2A and 2B and at which the first and second planetary gear type speed reducers 12A and 12B are located. The electric oil pump 70 overlaps with the first and second cylindrical walls 43 and 44 along the axial direction of the first and second electric motors 2A and 2B; accordingly, the electric oil pump 70 and at least part of the first and second planetary gear type speed reducers 12A and 12B (i.e., the ring gears 24A and 24B and the second pinions 27A and 27B in the present embodiment) overlap with each other along the axial direction of the first and second electric motors 2A and 2B.

The pair of projected portions 101 and 102 which define the strainer containing chamber 105 are provided with: through holes 107a and 107b serving as a left middle communication passage through which the left reservoir RL and the strainer containing chamber 105 are communicated with each other;

and through holes (not illustrated) serving as a right middle communication passage through which the right reservoir RR and the strainer containing chamber 105 are communicated with each other. Thus, the left reservoir RL and the right reservoir RR are communicated with each other via the strainer containing chamber 105.

Figure 7:
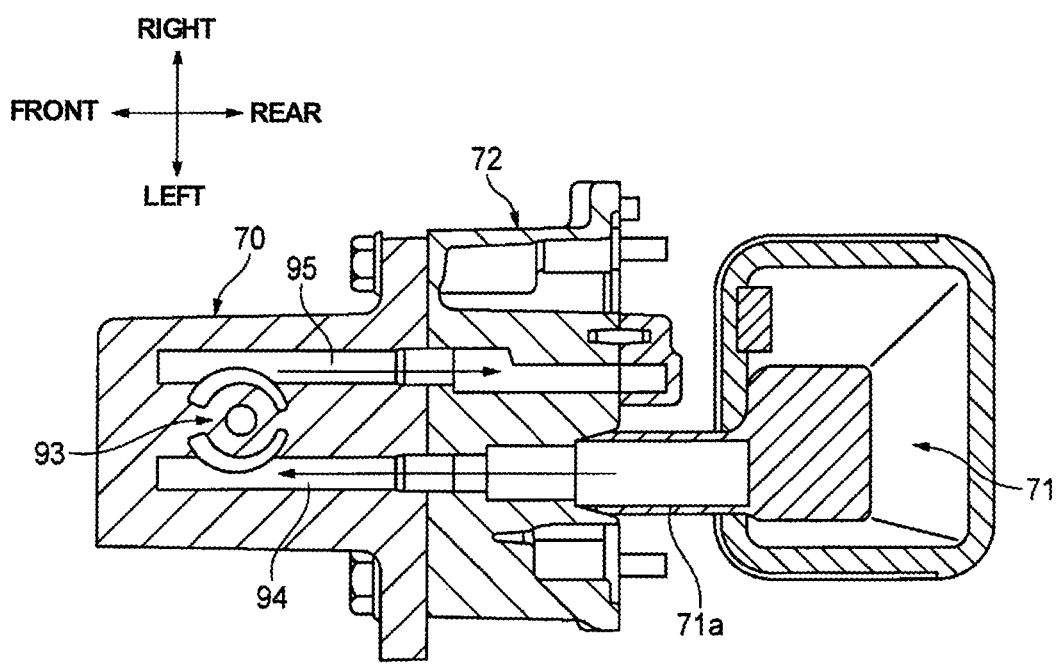
FIG. 7 is a cross-sectional view of the electric oil pump taken along the line VII-VII of FIG. 6.
Figure 9:
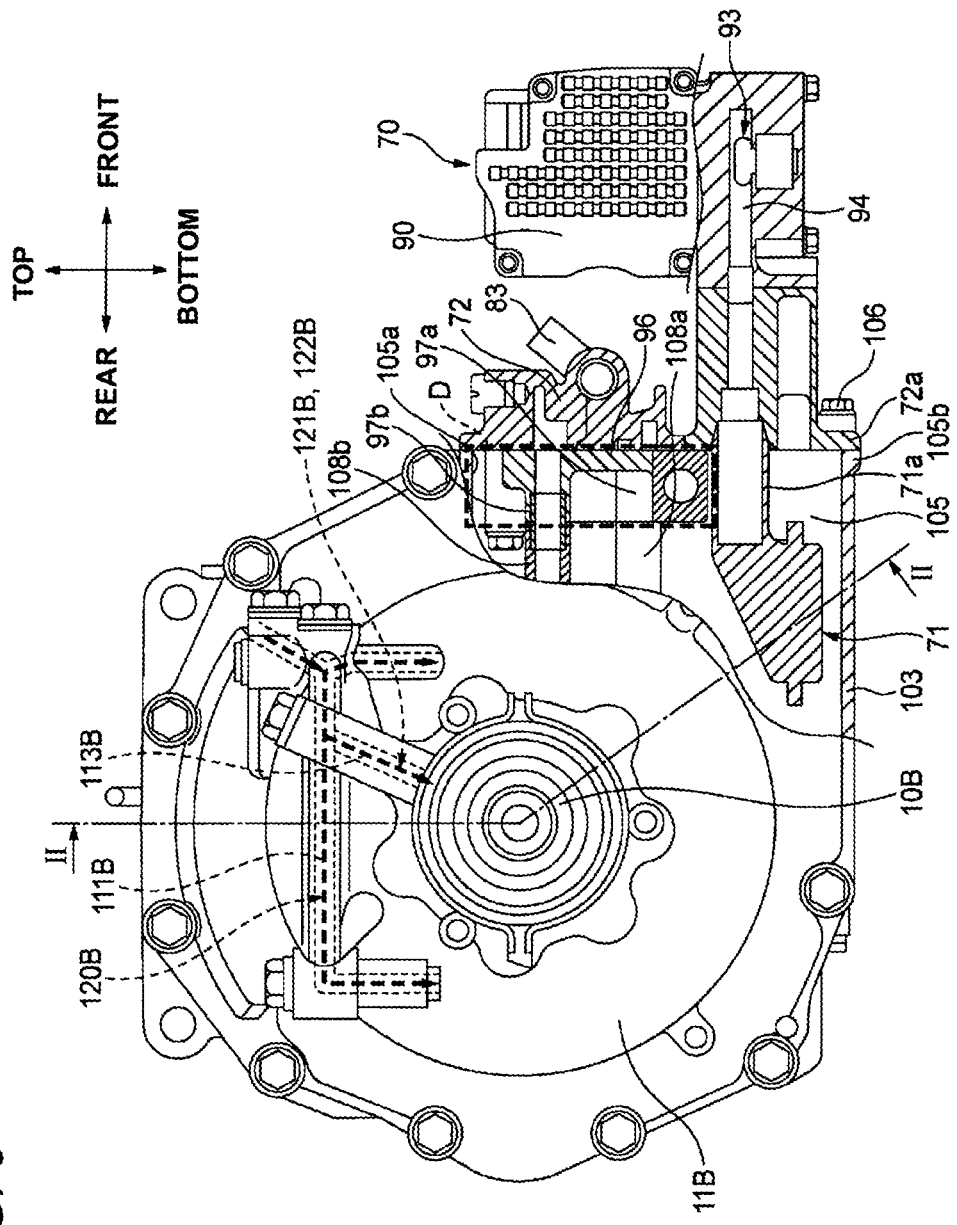
FIG. 9 is a side view of the rear wheel driving device, which schematically illustrates how oil flows.

As illustrated FIGS. 6, 7 and 9, the electric oil pump 70 is a "trochoid pump" which is driven by an additional electric motor 90 consisting of a position sensorless/brushless DC motor, operable at least in two modes, i.e., a high pressure mode and a low pressure mode, and controlled by PID control. While the amount of discharge is adjusted by rotating a not-illustrated inner rotor or outer rotor provided at a suction portion 93, oil that has flowed from the strainer 71 into an oil suction passage 94 provided in the electric oil pump 70 and the lid member 72 is discharged to an oil discharge passage 95 provided in the electric oil pump 70 and the lid member 72.

When the lid member 72 is fixed to the case 11, the electric oil pump 70 is attached to the lid member 72 so that the electric oil pump 70 is located in front of the lid member 72. At a position inward of the lid member 72, an oil passage defining cover 96 that defines, together with the lid member 72, part of oil passages of a hydraulic circuit 99 which will be described later is fixed with a bolt 69. In a region between the lid member 72 and the oil passage defining cover 96, a low pressure oil passage switching valve 73, a brake oil passage switching valve 74 and a relief valve 84, which will be described later, are disposed in this order from bottom to top. As illustrated in FIG. 9, a solenoid valve 83 is attached to a portion of the lid member 72 located opposite to the oil passage defining cover 96, so that communication or shutoff of a pilot oil passage 81 which is provided between the low pressure oil passage switching valve 73 and the brake oil passage switching valve 74 and will be described later is carried out by energizing the solenoid valve 83.

The strainer 71 is detachably fixed only to the lid member 72 by inserting a discharge port 71a of the strainer 71 into the lid member 72 and tightening them together with the bolt 69 by which the oil passage defining cover 96 is fastened to the lid member 72. The strainer 71 removes foreign matter from oil sucked through a suction port (not illustrated) provided in a lower surface of the strainer 71, and oil from which foreign matter has been removed is sent to the electric oil pump 70.

The strainer 71 which is provided as an additional separate member constituting the oil suction passage 94 together with the electric oil pump 70 and the lid member 72 is extended toward the case beyond the case fixation portion 72a of the lid member 72, and the suction port of the strainer 71 is located inside the reservoir of the strainer containing chamber 105 in an attached state where the lid member 72 is fixed to the case 11.

As illustrated in FIG. 6(b), in a front-rear direction, the strainer 71 is provided so as to be located within a parallel projection of an outer edge of the case fixation portion 72a of the lid member 72.

Two outlet pipes 97a and 97b are attached to the oil passage defining cover 96. The outlet pipe 97a is connected to an operation chamber port 108a of a brake oil passage 77 which will be described later. The outlet pipe 97b is connected to a cooling/lubrication port 108b of cooling/lubrication flow passages 120A, 121A, 120B and 121B and/or lubrication flow passages 122A and 122B which will be described later. The operation chamber port 108a and the cooling/lubrication port 108b are provided at an outer peripheral surface of the center case 11M inside the strainer containing chamber 105.

As mentioned above, in a state where the lid member 72, to which the electric oil pump 70 is attached, is attached to the front opening 105a of the strainer containing chamber 105, the outlet pipes 97a and 97b are connected to the operation chamber port 108a and the cooling/lubrication port 108b, respectively. At the same time, the front opening 105a defined at the position overlapping with the reservoir of the strainer containing chamber 105 is closed by the lid member 72, and an inner wall surface of the lid member 72 including the oil passage defining cover 96 constitutes a wall surface of the strainer containing chamber 105.

Accordingly, a connection between the outlet pipe 97a and the operation chamber port 108a constitutes a connection between the oil discharge passage 95 and the brake oil passage 77 leading to the operation chamber S, and a connection between the outlet pipe 97b and the cooling/lubrication port 108b constitutes a connection between the oil discharge passage 95 and the first cooling/lubrication flow passages 120A and 121A, the second cooling/lubrication flow passages 120B and 121B, the lubrication flow passage 122A or the lubrication flow passage 122B which will be described later.

The connection between the outlet pipe 97a and the operation chamber port 108a and the connection between the outlet pipe 97b and the cooling/lubrication port 108b are provided at positions located inward of the case 11 and away from the lid member fixation portion 105b, serving as the outer edge of the front opening 105a, in an attachment direction, so that a separation space D (see FIG. 9) is defined between these connections and the lid member fixation portion 105b. In the separation space D, there are disposed the low pressure oil passage switching valve 73, the brake oil passage switching valve 74 and the relief valve 84 which serve as valve means.

The case 11 is provided with the brake oil passage 77 (see FIG. 11) through which the operation chamber port 108a and the operation chamber S are communicated with each other. In addition, the case 11 is provided with: a front vertical oil passage 109 extending vertically from the cooling/lubrication port 108b at a front portion of the center case 11M; front horizontal oil passages 110A and 110B branching leftward and rightward from the front vertical oil passage 109, defined by outer wall surfaces 11A1, 11B1 and 11M1 of the cases 11A, 11B and 11M facing toward the front of the vehicle, and extending horizontally at front portions of the cases 11A, 11B and 11M; and front-rear horizontal oil passages 111A and 111B extended rearward from outer ends of the front horizontal oil passages 110A and 110B of the cases 11A and 11B. The front-rear horizontal oil passages 111A and 111B are provided with a plurality of discharge ports 112A and 112B (see FIGS. 2 and 10) through which oil is supplied to portions A1 and B1 of the first and second electric motors 2A and 2B which are to be cooled, i.e., coil lateral surfaces of the stators 14A and 14B; in addition, lubrication oil passages 113A and 113B (see FIGS. 2 and 9) extended downward toward axes of the axles 10A and 10B so that oil is supplied to the inside of the axles 10A and 10B are connected to the front-rear horizontal oil passages 111A and 111B, respectively.

Figure 10:
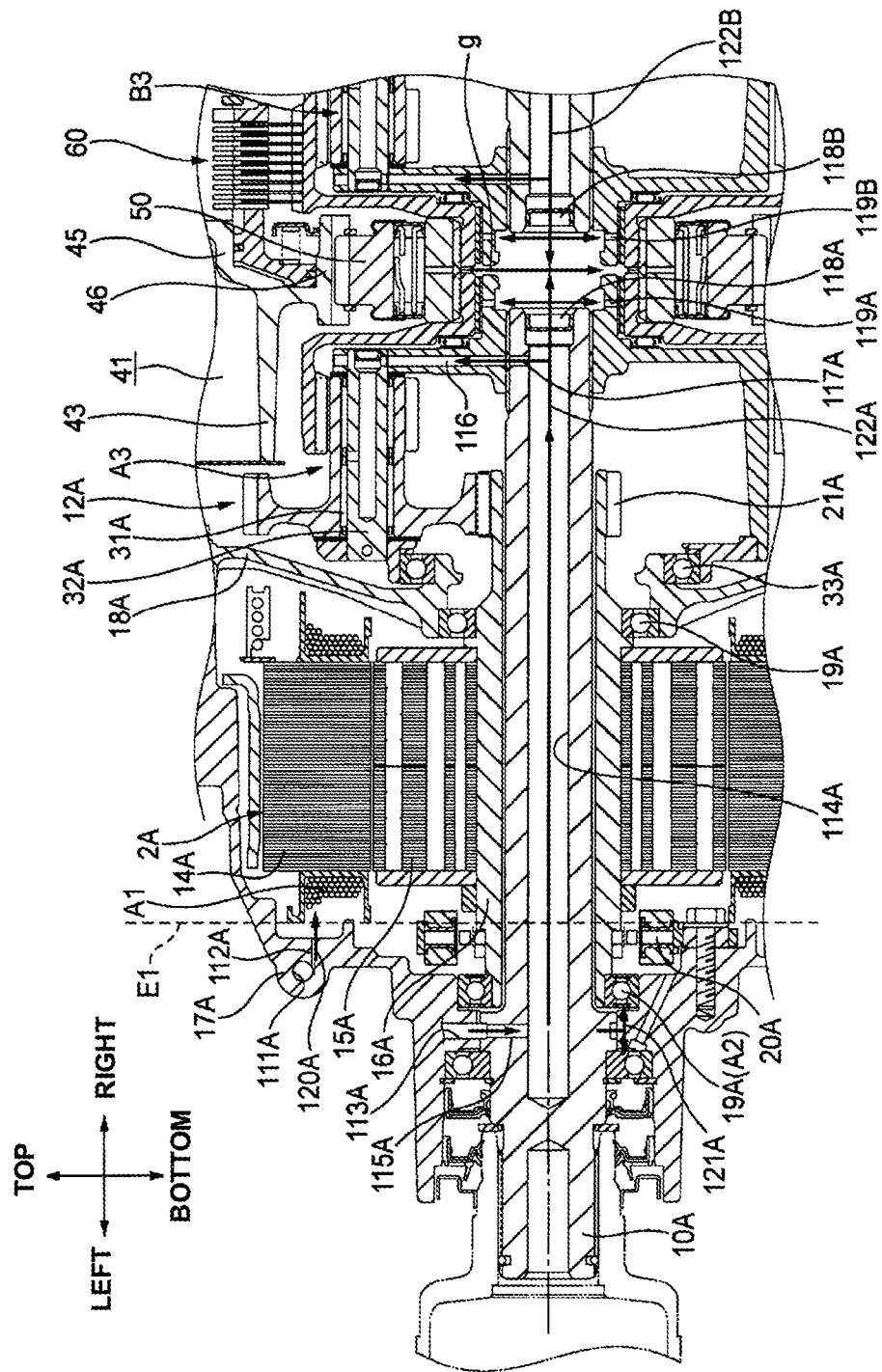
FIG. 10 is an enlarged cross-sectional view of main portions of the rear wheel driving device, which schematically illustrates how oil flows.

As illustrated in FIGS. 2 and 10, the front-rear horizontal oil passage 111A and the lubrication oil passage 113A communicated with the front horizontal oil passage 110A extending leftward are located axially outward of one end E1 which is an end of the first electric motor 2A opposite to the second electric motor 2B. The front-rear horizontal oil passage 111B and the lubrication oil passage 113B communicated with the front horizontal oil passage 110B extending rightward are located axially outward of the other end E2 which is an end of the second electric motor 2B opposite to the first electric motor 2A.

The axles 10A and 10B are provided with axial holes 114A and 114B extended along the axial direction of the first and second electric motors 2A and 2B, respectively. At positions axially overlapping with the lubrication oil passages 113A and 113B, the axles 10A and 10B are provided with first radial holes 115A and 115B communicated with the lubrication oil passages 113A and 113B, respectively. At positions axially overlapping with the planetary carriers 23A and 23B, the axles 10A and 10B are provided with second radial holes 117A and 117B communicated with an oil passage 116 provided in the planetary carriers 23A and 23B, respectively.

Therefore, the electric oil pump 70 is communicated and connected with the axial hole 114A at an outward position with respect to the first electric motor 2A (i.e., at the other side located opposite to the first planetary gear type speed reducer 12A), and portions A3 of the first planetary gear type speed reducer 12A which are to be lubricated (e.g., the needle bearing 31A and intermeshing portions of the gears 21A, 22A, 23A and 24A) are communicated and connected with the axial hole 114A at a center region with respect to the first electric motor 2A. The electric oil pump 70 is communicated and connected with the axial hole 114B at an outward position with respect to the second electric motor 2B (i.e., at the other side opposite to the second planetary gear type speed reducer 12B), and portions B3 of the second planetary gear type speed reducer 12B which are to be lubricated (e.g., the needle bearing 31B and intermeshing portions of the gears 21B, 22B, 23B and 24B) are communicated and connected with the axial hole 114B at a center region with respect to the second electric motor 2B.

Accordingly, the front vertical oil passage 109, the left front horizontal oil passage 110A, the front-rear horizontal oil passage 111A and the discharge port 112A, which are provided in the case 11, constitute the first cooling flow passage 120A for cooling a coil of the stator 14A of the first electric motor 2A. The front vertical oil passage 109, the left front horizontal oil passage 110A, the front-rear horizontal oil passage 111A and the lubrication oil passage 113A, which are provided in the case 11, constitute the first electric motor lubrication flow passage 121A for lubricating a portion A2 of the first electric motor 2A to be lubricated (e.g., the bearing 19A). The intra-case lubrication flow passages provided in the case 11 (i.e., the front vertical oil passage 109, the left front horizontal oil passage 110A, the front-rear horizontal oil passage 111A and the lubrication oil passage 113A), and the first radial hole 115A, the axial hole 114A and the second radial hole 117A, which are provided in the axle 10A, constitute the first planetary gear type speed reducer lubrication flow passage 122A for lubricating the portions A3 of the first planetary gear type speed reducer 12A which are to be lubricated.

The front vertical oil passage 109, the right front horizontal oil passage 110B, the front-rear horizontal oil passage 111B and the discharge port 112B, which are provided in the case 11, constitute the second cooling flow passage 120B for cooling a coil of the stator 14B of the second electric motor 2B. The front vertical oil passage 109, the right front horizontal oil passage 110B, the front-rear horizontal oil passage 111B and the lubrication oil passage 113B, which are provided in the case 11, constitute the second electric motor lubrication flow passage 121B for lubricating a portion B2 of the first electric motor 2A to be lubricated (e.g., the bearing 19B). The intra-case lubrication flow passages provided in the case 11 (i.e., the front vertical oil passage 109, the right front horizontal oil passage 110B, the front-rear horizontal oil passage 111B and the lubrication oil passage 113B), and the first radial hole 115B, the axial hole 114B and the second radial hole 117B, which are provided in the axle 10B, constitute the second planetary gear type speed reducer lubrication flow passage 122B for lubricating the portions B3 of the second planetary gear type speed reducer 12B which are to be lubricated.

Accordingly, the first cooling flow passage 120A and the first electric motor lubrication flow passage 121A are provided so that oil discharged from the electric oil pump 70 flows via a region outward of the one end E1 of the first electric motor 2A to cool the portion A1 of the first electric motor 2A to be cooled and lubricate the portion A2 of the first electric motor 2A to be lubricated. The second cooling flow passage 120B and the second electric motor lubrication flow passage 121B are provided so that oil discharged from the electric oil pump 70 flows via a region outward of the other end E2 of the second electric motor 2B to cool the portion B1 of the second electric motor 2B to be cooled and lubricate the portion B2 of the second electric motor 2B to be lubricated. Note that in the following description, the first electric motor cooling flow passage 120A and the first electric motor lubrication flow passage 121A may also be collectively referred to as the "first cooling/lubrication flow passages 120A and 121A", and the second electric motor cooling flow passage 120B and the second electric motor lubrication flow passage 121B may also be collectively referred to as the "second cooling/lubrication flow passages 120B and 121B".

The first planetary gear type speed reducer lubrication flow passage 122A is provided so that oil discharged from the electric oil pump 70 passes through the intra-case lubrication flow passages from an approximately center region of the case 11, flows via an outward region opposite to the first planetary gear type speed reducer 12A with respect to the first electric motor 2A, and then lubricates the portions A3 of the speed changer 12A to be lubricated. The second planetary gear type speed reducer lubrication flow passage 122B is provided so that oil discharged from the electric oil pump 70 passes through the intra-case lubrication flow passages from the approximately center region of the case 11, flows via an outward region opposite to the second planetary gear type speed reducer 12B with respect to the second electric motor 2B, and then lubricates the portions B3 of the speed changer 12B to be lubricated.

Oil that has flowed out from opening ends 118A and 118B of the axial holes 114A and 114B lubricates each portion of the one-way clutch 50 via through holes 119A and 119B provided in the planetary carriers 23A and 23B, and a gap g provided between the planetary carriers 23A and 23B and between the small-diameter portions 29A and 29B of the ring gears 24A and 24B.

Figure 11:
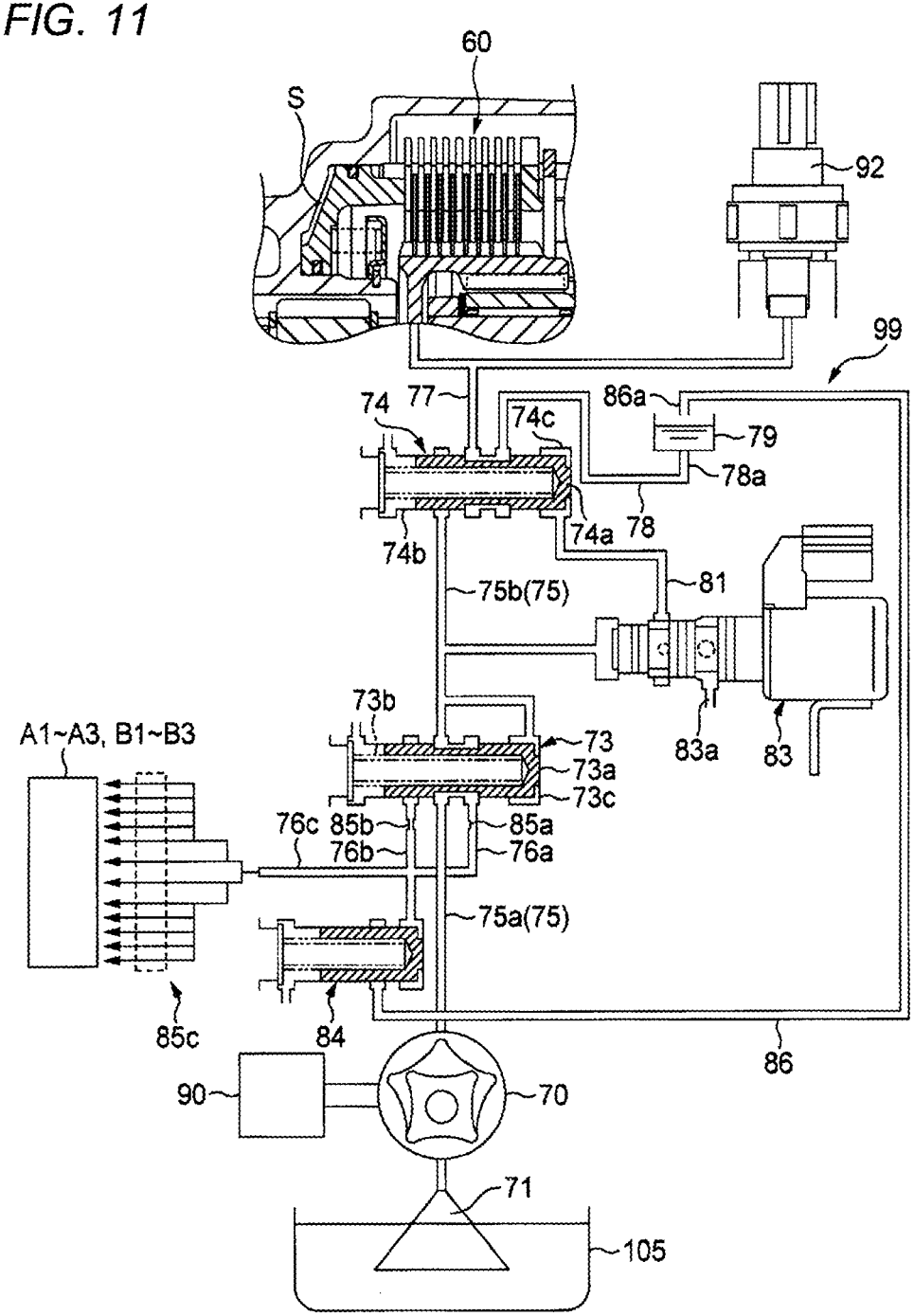
FIG. 11 is a diagram illustrating a hydraulic circuit for cooling and/or lubricating electric motors of the rear wheel driving device, and for lubricating speed changers thereof.

Next, referring to FIG. 11, the above-mentioned hydraulic circuit 99 for cooling and/or lubricating the electric motors 2A and 2B and for lubricating the speed changers 12A and 12B will be described.

The hydraulic circuit 99 is adapted so that oil sucked from the strainer 71 in the strainer containing chamber 105 and discharged from the electric oil pump 70 can be supplied to the operation chamber S of the hydraulic brake 60 via the low pressure oil passage switching valve 73 and the brake oil passage switching valve 74, and so that the oil can also be supplied, via the low pressure oil passage switching valve 73, to the portions A1 and B1 of the electric motors 2A and 2B to be cooled, the portions A2 and B2 of the electric motors 2A and 2B to be lubricated, and the portions A3 and B3 of the planetary gear type speed reducers 12A and 12B to be lubricated (hereinafter also referred to as the "portions A1 to B3 to be lubricated/cooled"). Note that the hydraulic circuit 99 is provided with a sensor 92 (see FIGS. 5 and 6) for detecting, for example, hydraulic pressure and temperature of the brake oil passage 77.

The low pressure oil passage switching valve 73 is connected with: a first line oil passage 75a included in a line oil passage 75 and adjacent to the electric oil pump 70; a second line oil passage 75b included in the line oil passage 75 and adjacent to the brake oil passage switching valve 74; a first low pressure oil passage 76a communicated with the portions A1 to B3 to be lubricated/cooled; and a second low pressure oil passage 76b communicated with the portions A1 to B3 to be lubricated/cooled. The low pressure oil passage switching valve 73 includes: a valve body 73a that always allows communication between the first line oil passage 75a and the second line oil passage 75b, and selectively allows communication between the line oil passage 75 and the first low pressure oil passage 76a or the second low pressure oil passage 76b; a spring 73b for urging the valve body 73a in a direction in which the line oil passage 75 and the first low pressure oil passage 76a are communicated with each other (i.e., rightward in FIG. 11); and an oil chamber 73c that presses the valve body 73a in a direction in which the line oil passage 75 and the second low pressure oil passage 76b are communicated with each other (i.e., leftward in FIG. 11) by the hydraulic pressure of the line oil passage 75. Accordingly, the valve body 73a is urged in the direction, in which the line oil passage 75 and the first low pressure oil passage 76a are communicated with each other (i.e., rightward in FIG. 11), by the spring 73b, and is pressed in the direction, in which the line oil passage 75 and the second low pressure oil passage 76b are communicated with each other (i.e., leftward in FIG. 11), by the hydraulic pressure of the line oil passage 75 applied to the oil chamber 73c located at a right end of the low pressure oil passage switching valve 73 in FIG. 11.

In this embodiment, the urging force of the spring 73b is set so that the hydraulic pressure of the line oil passage 75 applied to the oil chamber 73c during operation of the electric oil pump 70 in the low pressure mode does not move the valve body 73a, and thus the line oil passage 75 is shut off from the second low pressure oil passage 76b and communicated with the first low pressure oil passage 76a (the position of the valve body 73a obtained in this case will hereinafter be referred to as a "low pressure side position"), and so that the hydraulic pressure of the line oil passage 75 applied to the oil chamber 73c during operation of the electric oil pump 70 in the high pressure mode moves the valve body 73a, and thus the line oil passage 75 is shut off from the first low pressure oil passage 76a and communicated with the second low pressure oil passage 76b (the position of the valve body 73a obtained in this case will hereinafter be referred to as a "high pressure side position").

The brake oil passage switching valve 74 is connected with the second line oil passage 75b included in the line oil passage 75, and the brake oil passage 77 connected to the hydraulic brake 60, and is also connected via a high position drain 78 with a reservoir 79. The brake oil passage switching valve 74 includes: a valve body 74a that allows communication between the second line oil passage 75b and the brake oil passage 77 or shuts off the second line oil passage 75b and the brake oil passage 77 from each other; a spring 74b for urging the valve body 74a in a direction in which the second line oil passage 75b and the brake oil passage 77 are shut off from each other (i.e., rightward in FIG. 11); and an oil chamber 74c that presses the valve body 74a in a direction in which the second line oil passage 75b and the brake oil passage 77 are communicated with each other (i.e., leftward in FIG. 11) by the hydraulic pressure of the line oil passage 75. Accordingly, the valve body 74a is urged in the direction, in which the second line oil passage 75b and the brake oil passage 77 are shut off from each other (i.e., rightward in FIG. 11), by the spring 74b, and can be pressed in the direction, in which the second line oil passage 75b and the brake oil passage 77 are communicated with each other (i.e., leftward in FIG. 11), by the hydraulic pressure of the line oil passage 75 applied to the oil chamber 74c.

The urging force of the spring 74b is set so that the hydraulic pressure of the line oil passage 75 applied to the oil chamber 74c during operation of the electric oil pump 70 in the low and high pressure modes moves the valve body 74a from a valve closing position to a valve opening position, and thus the brake oil passage 77 is shut off from the high position drain 78 and communicated with the second line oil passage 75b. In other words, regardless of whether the electric oil pump 70 is operated in the low pressure mode or the high pressure mode, the hydraulic pressure of the line oil passage 75 applied to the oil chamber 74c exceeds the urging force of the spring 74b, and thus the brake oil passage 77 is shut off from the high position drain 78 and communicated with the second line oil passage 75b.

In a state where the second line oil passage 75b and the brake oil passage 77 are shut off from each other, the hydraulic brake 60 is communicated with the reservoir 79 via the brake oil passage 77 and the high position drain 78. In this embodiment, the reservoir 79 is located vertically higher than the strainer containing chamber 105. More preferably, the reservoir 79 is disposed so that its vertically uppermost region is located vertically higher than a midpoint between vertically uppermost and lowermost regions of the operation chamber S of the hydraulic brake 60. Accordingly, in a state where the brake oil passage switching valve 74 is closed, oil stored in the operation chamber S of the hydraulic brake 60 is not directly discharged to the strainer containing chamber 105, but is discharged to the reservoir 79 and stored therein. Note that oil which has overflowed the reservoir 79 is discharged to the strainer containing chamber 105. An end 78a of the high position drain 78 located adjacent to the reservoir 79 is connected to a bottom surface of the reservoir 79.

The oil chamber 74c of the brake oil passage switching valve 74 can be connected to the second line oil passage 75b of the line oil passage 75 via the pilot oil passage 81 and the solenoid valve 83. The solenoid valve 83 includes an electromagnetic three-way valve controlled by an ECU (not illustrated), so that when the solenoid valve 83 is not energized by the ECU, the second line oil passage 75b is connected to the pilot oil passage 81 and thus the hydraulic pressure of the line oil passage 75 is applied to the oil chamber 74c.

In a state where the solenoid valve 83 is energized, oil stored in the oil chamber 74c is discharged to the strainer containing chamber 105 via a discharge oil passage 83a, and the second line oil passage 75b and the pilot oil passage 81 are shut off from each other.

In the hydraulic circuit 99, the first low pressure oil passage 76a and the second low pressure oil passage 76b are merged with each other in a downstream region to constitute a common low pressure oil passage 76c. The merged region is connected with a relief valve 84 that allows, when a line pressure of the common low pressure oil passage 76c is equal to or higher than a given pressure, oil in the common low pressure oil passage 76c to be discharged to the reservoir 79 via a relief drain 86 to cause a reduction in hydraulic pressure. Note that an end 86a of the relief drain 86 located adjacent to the oil reservoir is disposed higher than a vertically uppermost region of the reservoir 79.

In this embodiment, the first low pressure oil passage 76a and the second low pressure oil passage 76b are provided with orifices 85a and 85b serving as flow passage resistance means, respectively. The orifice 85a of the first low pressure oil passage 76a is adapted to have a diameter larger than that of the orifice 85b of the second low pressure oil passage 76b. Accordingly, a flow passage resistance of the second low pressure oil passage 76b is greater than that of the first low pressure oil passage 76a, and the amount of pressure reduction in the second low pressure oil passage 76b during operation of the electric oil pump 70 in the high pressure mode is greater than the amount of pressure reduction in the first low pressure oil passage 76a during operation of the electric oil pump 70 in the low pressure mode; hence, the hydraulic pressures of the common low pressure oil passage 76c in the high pressure mode and the low pressure mode are substantially equal to each other.

As described above, the low pressure oil passage switching valve 73 connected to the first low pressure oil passage 76a and the second low pressure oil passage 76b is operated as follows. During operation of the electric oil pump 70 in the low pressure mode, the urging force of the spring 73b exceeds the hydraulic pressure inside the oil chamber 73c, and the valve body 73a is located at the low pressure side position due to the urging force of the spring 73b, so that the line oil passage 75 is shut off from the second low pressure oil passage 76b and communicated with the first low pressure oil passage 76a. Oil flowing through the first low pressure oil passage 76a is reduced in pressure upon reception of the flow passage resistance of the orifice 85a, and then reaches, via the common low pressure oil passage 76c, the portions A1 to B3 to be lubricated/cooled. During operation of the electric oil pump 70 in the high pressure mode, the hydraulic pressure inside the oil chamber 73c exceeds the urging force of the spring 73b, and the valve body 73a is located at the high pressure side position against the urging force of the spring 73b, so that the line oil passage 75 is shut off from the first low pressure oil passage 76a and communicated with the second low pressure oil passage 76b. Oil flowing through the second low pressure oil passage 76b is reduced in pressure upon reception of the flow passage resistance of the orifice 85b which is greater than that of the orifice 85a, and then reaches, via the common low pressure oil passage 76c, the portions A1 to B3 to be lubricated/cooled.

Accordingly, when the electric oil pump 70 is switched from the low pressure mode to the high pressure mode, switching is made automatically from the oil passage with the smaller flow passage resistance to the oil passage with the greater flow passage resistance in response to a change in the hydraulic pressure of the line oil passage 75; thus, during the high pressure mode, excessive supply of oil to the portions A1 to B3 to be lubricated/cooled is prevented.

Oil passages located between the common low pressure oil passage 76c and the portions A1 to B3 to be lubricated/cooled are provided with a plurality of orifices 85c serving as additional flow passage resistance means. The plurality of orifices 85c are set so that a minimum flow passage cross-sectional area of the orifice 85a of the first low pressure oil passage 76a is smaller than a minimum flow passage cross-sectional area of the plurality of orifices 85c. In other words, the flow passage resistance of the orifice 85a of the first low pressure oil passage 76a is set to be greater than a flow passage resistance of the plurality of orifices 85c. In this case, the minimum flow passage cross-sectional area of the plurality of orifices 85c is a total sum of the minimum flow passage cross-sectional areas of the orifices 85c. Thus, an adjustment can be made so that a desired amount of oil is allowed to flow by using the orifice 85a of the first low pressure oil passage 76a and the orifice 85b of the second low pressure oil passage 76b.

As described thus far, in the rear wheel driving device 1 according to the present embodiment, the electric oil pump 70 is disposed between the one end E1 of the first electric motor 2A and the other end E2 of the second electric motor 2B, thus enabling the rear wheel driving device 1 to be made compact in a direction in which the first and second electric motors 2A and 2B are aligned. The first cooling/lubrication flow passages 120A and 121A extend via a region outward of the one end E1 of the first electric motor 2A, and the second cooling/lubrication flow passages 120B and 121B extend via a region outward of the other end E2 of the second electric motor 2B. Hence, sufficient lengths can be ensured for the first cooling/lubrication flow passages 120A and 121A and the second cooling/lubrication flow passages 120B and 121B, enabling suitable cooling of oil; thus, cooling performance is enhanced, and favorable lubrication is carried out by utilizing a sufficient viscosity of oil resulting from temperature reduction.

Since the electric oil pump 70 is disposed at the position intersecting the virtual plane P orthogonal to the axial direction of the first and second electric motors 2A and 2B and equidistant from the first and second electric motors 2A and 2B, the length of the first cooling/lubrication flow passages 120A and 121A and that of the second cooling/lubrication flow passages 120B and 121B can be equal to each other, so that pressure loss is also uniformized and oil can be equally supplied to the first and second electric motors 2A and 2B.

Since the first and second electric motors 2A and 2B have the same diameter and are disposed in mirror symmetry, the length of the first cooling/lubrication flow passages 120A and 121A and that of the second cooling/lubrication flow passages 120B and 121B can be further equalized, so that pressure loss is further uniformized and oil can be equally supplied to the first and second electric motors 2A and 2B.

The case 11 in which the first and second electric motors 2A and 2B are contained is further provided, and at least part of each of the first cooling/lubrication flow passages 120A and 121A and the second cooling/lubrication flow passages 120B and 121B is provided in the case 11; therefore, the first cooling/lubrication flow passages 120A and 121A and the second cooling/lubrication flow passages 120B and 121B can be provided without use of components such as hoses, thus making it possible to reduce the number of components and to reduce damage to the flow passages.

The front vertical oil passage 109 and the front horizontal oil passages 110A and 110B of the first cooling/lubrication flow passages 120A and 121A and the second cooling/lubrication flow passages 120B and 121B are defined by the outer wall surfaces 11A1, 11B1 and 11M1 of the lateral cases 11A and 11B and center case 11M facing toward the front of the vehicle, and therefore, oil in the first cooling/lubrication flow passages 120A and 121A and the second cooling/lubrication flow passages 120B and 121B can be more efficiently cooled through the case 11 by wind caused by traveling.

Since the electric oil pump 70 is driven by the additional electric motor 90 different from the first and second electric motors 2A and 2B, the electric oil pump 70 having increased location flexibility can be disposed suitably.

The first electric motor 2A drives the left rear wheel LWr of the vehicle, and the second electric motor 2B drives the right rear wheel RWr of the vehicle, thus making it possible to drive the left rear wheel LWr and the right rear wheel RWr independently.

In the rear wheel driving device according to the present embodiment, the first planetary gear type speed reducer lubrication flow passage 122A extends via the other side opposite to the first planetary gear type speed reducer 12A with respect to the first electric motor 2A, and the second planetary gear type speed reducer lubrication flow passage 122B extends via the other side opposite to the second planetary gear type speed reducer 12B with respect to the second electric motor 2B. Hence, sufficient lengths can be ensured for the first and second planetary gear type speed reducer lubrication flow passages 122A and 122B, and suitable cooling of oil is enabled, so that favorable lubrication is carried out by utilizing a sufficient viscosity of oil resulting from temperature reduction.

The axles 10A and 10B are located closer to the left and right rear wheels LWr and RWr than the first and second planetary gear type speed reducers 12A and 12B on the power transmission paths between the first and second electric motors 2A and 2B and the left and right rear wheels LWr and RWr, respectively. The axles 10A and 10B pass through the first and second electric motors 2A and 2B, and extend from the ends of the first electric motor 2A and the ends of the second electric motor 2B, respectively; therefore, passing of the axles 10A and 10B through the first and second electric motors 2A and 2B makes it possible to reduce the rear wheel driving device 1 in radial size.

The axial holes 114A and 114B extending along the axial direction of the first and second electric motors 2A and 2B are provided inside the axles 10A and 10B, respectively. The electric oil pump 70 is connected to the axial holes 114A and 114B through the other side defined with respect to the first and second electric motors 2A and 2B, and the portions A3 and B3 of the first and second planetary gear type speed reducers 12A and 12B to be lubricated are connected to the axial holes 114A and 114B through the one side defined with respect to the first and second electric motors 2A and 2B, thus providing the first and second planetary gear type speed reducer lubrication flow passages 122A and 122B. Hence, it is possible to provide the first and second planetary gear type speed reducer lubrication flow passages 122A and 122B while reducing portions to be provided in the case 11, thus enabling structure simplification of the case 11.

The electric oil pump 70 and the first and second planetary gear type speed reducers 12A and 12B overlap with each other in the axial direction of the first and second electric motors 2A and 2B, and thus the resulting apparatus can be made compact in the axial direction.

The first and second planetary gear type speed reducer lubrication flow passages 122A and 122B include the front vertical oil passage 109, the front horizontal oil passages 110A and 110B, the front-rear horizontal oil passages 111 and the lubrication oil passages 113, which are provided in the case 11. Oil discharged from the electric oil pump 70 passes through the flow passages 109, 110A, 110B, 111A, 111B, 113A and 113B, flows via the inside of the axles 10A and 10B from the other side defined with respect to the first and second electric motors 2A and 2B, and then lubricates the portions A3 and B3 of the first and second planetary gear type speed reducers 12A and 12B to be lubricated. Therefore, the lubrication flow passages 122A and 122B can be provided without use of components such as hoses, thus making it possible to reduce the number of components and to reduce damage to the flow passages.

Since the front vertical oil passage 109 and the front horizontal oil passages 110A and 110B are defined by the outer wall surfaces 11A1, 11B1 and 11M1 of the lateral cases 11A and 11B and center case 11M facing toward the front of the vehicle, oil in the lubrication flow passages 122A and 122B can be more efficiently cooled through the case 11 by wind caused by traveling.

In the rear wheel driving device 1 according to the present embodiment, there is provided the lid member 72 which is attachable and detachable to and from the case 11 and to which the electric oil pump 70 is attached. The case 11 includes the front opening 105a opened outward. In the attached state where the lid member fixation portion 105b provided at the case 11 and the case fixation portion 72a provided at the lid member 72 are fixed to each other, the front opening 105a of the case 11 is closed by the lid member 72; in addition, the oil discharge passage 95 of the electric oil pump 70, provided in the lid member 72, is connected to the first and second electric motor cooling flow passages 120A and 120B, the first and second electric motor lubrication flow passages 121A and 121B, and the first and second planetary gear type speed reducer lubrication flow passages 122A and 122B of the case 11, or more specifically, the outlet pipe 97b and the cooling/lubrication port 108b are connected to each other. Thus, when the lid member 72 to which the electric oil pump 70 is attached is fixed to the case 11, the front opening 105a of the case 11 is closed, and at the same time, the flow passages are connected to each other; hence, assembly workability of the electric oil pump 70 is improved, and time required for assembly work can be reduced. Since the electric oil pump 70 is disposed at the lid member 72 attachable and detachable to and from the case 11, maintenance, replacement and assembly of the electric oil pump 70 are facilitated.

The connection between the outlet pipe 97b and the cooling/lubrication port 108b is located inward of the outer edge of the front opening 105a. Thus, even when oil is leaked from the connection between the outlet pipe 97b and the cooling/lubrication port 108b, the leaked oil can be stored inside the case 11.

At least part of the front opening 105a is defined at the position overlapping with the reservoir of the strainer containing chamber 105, and the lid member 72 constitutes the wall surface of the strainer containing chamber 105 in the attached state. Thus, the lid member 72, to which the electric oil pump 70 is attached, and the strainer containing chamber 105 can be disposed close to each other, and the suction-side flow passage of the electric oil pump 70 can be reduced in length. In a state where the lid member 72 is detached, the wall surface of the strainer containing chamber 105 is partially removed, thus making it possible to easily visually recognize the inside of the strainer containing chamber 105, and to easily perform, for example, cleaning of the strainer containing chamber 105.

In the attached state, the connection between the outlet pipe 97b and the cooling/lubrication port 108b is provided at the position located inward of the case 11 and away from the lid member fixation portion 105b of the case 11 in the attachment direction. In the separation space D of the case 11 located between the connection and the lid member fixation portion 105b in the attachment direction, there are disposed the low pressure oil passage switching valve 73, the brake oil passage switching valve 74 and the relief valve 84 for switching the flow passage(s) interposed in the first cooling/lubrication flow passages 120A and 121A, the second cooling/lubrication flow passages 120B and 121B, the lubrication flow passages 122A and 122B, and the brake oil passage 77. Accordingly, the valves 73, 74 and 84 can be disposed inside the case 11, and portions of the case 11 protruded outward can be reduced.

The oil suction passage 94 through which the strainer containing chamber 105 and the electric oil pump 70 are communicated with each other is extended toward the case beyond the case fixation portion 72a of the lid member 72, and the suction port of the oil suction passage 94 is located inside the reservoir of the strainer containing chamber 105 in the attached state. Thus, attachment of the lid member 72 to the case 11 allows oil to be sucked from the inside of the reservoir of the strainer containing chamber 105 of the case through the suction port of the oil suction passage 94.

The oil suction passage 94, through which the strainer containing chamber 105 and the electric oil pump 70 are communicated with each other, is defined by the lid member 72. Thus, the oil suction passage 94 and the lid member 72 can be handled as a one-piece component, which improves attaching and detaching workability; in addition, the oil suction passage 94 does not have to be provided in the case, thus making it possible to achieve structure simplification and weight reduction of the case 11.

The oil suction passage 94, through which the strainer containing chamber 105 and the electric oil pump 70 are communicated with each other, is defined by the lid member 72 and the strainer 71 detachably fixed to the lid member 72, and the strainer 71 is fixed only to the lid member 72. Thus, attachment and detachment of the strainer 71, which defines the oil suction passage 94, to and from the case 11 is carried out simultaneously with attachment and detachment of the lid member 72 thereto and therefrom, thus making it possible to easily attach and detach the strainer 71 to and from the case 11. Since the strainer 71 is attachable and detachable to and from the lid member 72, maintenance and replacement of the oil suction passage 94 can also be easily carried out.

The oil suction passage 94, through which the strainer containing chamber 105 and the electric oil pump 70 are communicated with each other, is provided so as to be located within the parallel projection of the outer edge of the case fixation portion 72a of the lid member 72. Thus, when the lid member 72 is detached, the oil suction passage 94 can be easily detached without being caught by the case 11.

The oil suction passage 94, through which the strainer containing chamber 105 and the electric oil pump 70 are communicated with each other, is provided with the strainer 71 for filtering oil. Thus, oil passing through the oil suction passage 94 can be filtered.

There is provided the hydraulic brake 60 which is disposed on the power transmission path connected to the electric motors 2A and 2B and by which power transmission is allowed or interrupted. The case 11 includes the brake oil passage 77 through which the electric oil pump 70 and the operation chamber S of the hydraulic brake 60 are communicated with each other, so that the electric oil pump 70 supplies oil to the operation chamber S via the brake oil passage 77. Thus, the electric oil pump 70 is allowed to supply oil to both of the first cooling/lubrication flow passages 120A and 121A and second cooling/lubrication flow passages 120B and 121B of the case 11, and the operation chamber S of the hydraulic brake 60, resulting in simplification in structure.

In the attached state, the oil discharge passage 95 provided in the lid member 72 and the brake oil passage 77 of the case 11 are connected to each other, or more specifically, the outlet pipe 97a and the operation chamber port 108a are connected to each other. Thus, in addition to closing of the front opening 105a and connection of the first cooling/lubrication flow passages 120A and 121A and second cooling/lubrication flow passages 120B and 121B, connection of the brake oil passage 77 is also carried out at the same time, thus improving assembly workability of the electric oil pump 70 and making it possible to reduce the time required for assembly work.

The connection between the outlet pipe 97a and the operation chamber port 108a is located inward of the outer edge of the front opening 105a. Thus, even when oil is leaked from the connection between the outlet pipe 97a and the operation chamber port 108a, the leaked oil can be stored inside the case 11.

The electric oil pump 70 is driven by the additional electric motor 90 different from the electric motors 2A and 2B. Thus, the electric oil pump 70 is of a motor-driven type, and therefore, the lid member 72 can be disposed at a more suitable position.

The first electric motor cooling flow passage 120A, first electric motor lubrication flow passage 121A and first planetary gear type speed reducer lubrication flow passage 122A, and the second electric motor cooling flow passage 120B, second electric motor lubrication flow passage 121B and second planetary gear type speed reducer lubrication flow passage 122B include the front vertical oil passage 109 shared in a region adjacent to the electric oil pump 70. In the attached state, the oil discharge passage 95 of the lid member 72 and the front vertical oil passage 109 of the case 11 are connected to each other. Thus, even when the device includes the first cooling/lubrication flow passages 120A and 121A, the second cooling/lubrication flow passages 120B and 121B, and the first and second planetary gear type speed reducer lubrication flow passages 122A and 122B, the flow passages are connected to each other just by connecting the oil discharge passage 95 provided in the lid member 72 with the front vertical oil passage 109 of the case 11; hence, assembly workability of the electric oil pump 70 is improved, and the time required for assembly work can be reduced.

The first electric motor 2A drives the left rear wheel LWr of the vehicle, and the second electric motor 2B drives the right rear wheel RWr of the vehicle, thus making it possible to drive the left rear wheel LWr and the right rear wheel RWr independently.

In the rear wheel driving device 1 according to the present embodiment, there is provided the lid member 72 which is attachable and detachable to and from the case 11 and to which the electric oil pump 70 is attached. The case 11 includes the front opening 105a opened outward. In the attached state where the lid member fixation portion 105b provided at the case 11 and the case fixation portion 72a provided at the lid member 72 are fixed to each other, the front opening 105a of the case 11 is closed by the lid member 72; in addition, the oil discharge passage 95 of the electric oil pump 70, provided in the lid member 72, and the brake oil passage 77 of the case 11 are connected to each other, or more specifically, the outlet pipe 97a and the operation chamber port 108a are connected to each other. Thus, when the lid member 72 to which the electric oil pump 70 is attached is fixed to the case 11, the front opening 105a of the case 11 is closed, and at the same time, the flow passages are connected to each other; hence, assembly workability of the electric oil pump 70 is improved, and the time required for assembly work can be reduced. Since the electric oil pump 70 is disposed at the lid member 72 attachable and detachable to and from the case 11, maintenance, replacement and assembly of the electric oil pump 70 are facilitated.

Note that the present invention is not limited to the above-described embodiment, and changes, modifications, etc. may be made as appropriate.

The electric motor 5 may be used as a sole driving source for the front wheel driving device 6 without using the internal combustion engine 4.

In the present embodiment, the left lateral case 11A and the center case 11M constitute the first case 11L, and the right lateral case 11B and the center case 11M constitute the second case 11R. However, the present invention is not limited to this structure so long as the first case 11L contains the first electric motor 2A and the first planetary gear type speed reducer 12A and includes the left reservoir RL, and the second case 11R contains the second electric motor 2B and the second planetary gear type speed reducer 12B and includes the right reservoir RR.

In the present invention, either one of the first electric motor cooling flow passage 120A and the first electric motor lubrication flow passage 121A, serving as the first cooling/lubrication flow passages, may be provided so as to be extended via the region outward of the one end E1 of the first electric motor 2A. Similarly, either one of the second electric motor cooling flow passage 120B and the second electric motor lubrication flow passage 121B, serving as the second cooling/lubrication flow passages, may be provided so as to extend through the region outward of the other end E2 of the second electric motor 2B.

In the present invention, at least one electric motor and at least one speed changer which are disposed so as to be aligned with each other may be provided. In that case, the liquid medium supply device may be disposed at one side which is defined with respect to the electric motor in the aligned direction of the electric motor and the speed changer and at which the speed changer is located, and the lubrication flow passage through which a liquid medium is supplied to the portions of the speed changer to be lubricated may be provided so as to be extended from the liquid medium supply device via the other side opposite to the speed changer with respect to the electric motor.

In the present invention, oil is used as a liquid medium for cooling and lubrication, but any other liquid may be used.

The present invention is not limited to the case where the first and second electric motors 2A and 2B are aligned with each other with the axes thereof coinciding with each other as in the present embodiment; for example, the present invention may be applied to a case where the first and second electric motors 2A and 2B are aligned with each other with the axes thereof coinciding with each other as viewed in a plane which includes the axes of the first and second electric motors 2A and 2B and which is obtained when the first and second electric motors 2A and 2B are disposed so that the axes thereof are parallelly deviated from each other. Similarly, the present invention is not limited to the case where the first electric motor 2A and the first speed changer 12A are aligned with each other with the axes thereof coinciding with each other as in the present embodiment; for example, the present invention may be applied to a case where the first electric motor 2A and the first speed changer 12A are aligned with each other with the axes thereof coinciding with each other as viewed in a plane which includes the axes of the first electric motor 2A and the first speed changer 12A and which is obtained when the first electric motor 2A and the first speed changer 12A are disposed so that the axes thereof are parallelly deviated from each other.

In the present embodiment, the first and second electric motor cooling flow passages 120A and 120B, the first and second electric motor lubrication flow passages 121A and 121B, and the first and second planetary gear type speed reducer lubrication flow passages 122A and 122B are adapted so as to be branched from the front vertical oil passage 109 of the case 11. Therefore, in the attached state where the case 11 and the lid member 72 are fixed to each other, the outlet pipe 97b and the cooling/lubrication port 108b, which leads to the front vertical oil passage 109, are connected to each other; thus, the oil discharge passage 95 of the electric oil pump 70 provided at the lid member 72 is connected to all of the first and second electric motor cooling flow passages 120A and 120B, the first and second electric motor lubrication flow passages 121A and 121B, and the first and second planetary gear type speed reducer lubrication flow passages 122A and 122B of the case 11. However, the present invention is not limited to such a structure; alternatively, in the attached state where the case 11 and the lid member 72 are fixed to each other, in addition to closing of the front opening 105a of the case 11 by the lid member 72, at least one of the first and second electric motor cooling flow passages 120A and 120B, the first and second electric motor lubrication flow passages 121A and 121B, and the first and second planetary gear type speed reducer lubrication flow passages 122A and 122B may be connected to the oil discharge passage 95 provided in the lid member 72.

In the present invention, the case 11 may have either the electric motors 2A and 2B or the speed changers 12A and 12B therein. In that case, either the first and second electric motor cooling flow passages 120A and 120B and the first and second electric motor lubrication flow passages 121A and 121B, or the first and second planetary gear type speed reducer lubrication flow passages 122A and 122B may accordingly be provided in the case 11.

In the present embodiment, the lower region of the strainer containing chamber 105 defines the reservoir, at least part of the front opening 105a is disposed at the position overlapping with the reservoir of the strainer containing chamber 105, and the lid member 72 by which the front opening 105a is closed is disposed so that at least part of the lid member 72 constitutes a wall surface of the reservoir of the strainer containing chamber 105. However, in the present invention, the front opening 105a may be disposed at a position that does not overlap with the reservoir, and the lid member 72 may be disposed so that the lid member 72 does not constitute the wall surface of the reservoir. For example, the strainer 71 may be provided so as to be extended downward and deviated from the parallel projection of the outer edge of the case fixation portion 72a of the lid member 72, and the front opening 105a may be provided above an oil level that defines the reservoir.

The separate member, at which the liquid medium supply device according to the present invention is disposed, is not limited to a structure in which the electric oil pump 70 is attached to the lid member 72 attachable and detachable to and from the case 11 as in the present embodiment. Alternatively, an electric oil pump assembly may be provided in which the electric oil pump 70 itself constitutes the separate member and closes the opening of the case.

It should be noted that the present invention is based on Japanese Patent Application No. 2011-127533 filed on Jun. 7, 2011, and Japanese Patent Application No. 2011-143213 filed on Jun. 28, 2011, the contents of which are hereby incorporated by reference.

DESCRIPTION OF REFERENCE CHARACTERS 1 rear wheel driving device (vehicle driving device)
2A first electric motor
2B second electric motor
10A, 10B axle (driving shaft)
11 case
11A1, 11B1, 11M1 outer wall surface
12A, 12B planetary gear type speed reducer (speed changer)
60 hydraulic brake (hydraulic engagement/disengagement means)
70 electric oil pump (liquid medium supply device)
71 strainer
72 lid member (separate member)
72a case fixation portion
73 low pressure oil passage switching valve (valve means)
74 brake oil passage switching valve (valve means)

77 brake oil passage (hydraulic passage)
84 relief valve (valve means)
94 oil suction passage (suction-side flow passage)
95 oil discharge passage (discharge-side flow passage)
105 strainer containing chamber (reservoir)
105a front opening
105b lid member fixation portion (separate member fixation portion)
108a operation chamber port
109 front vertical oil passage (intra-case lubrication flow passage, or common flow passage)
110A, 110B front horizontal oil passage (intra-case lubrication flow passage)
111A, 111B front-rear horizontal oil passage (intra-case lubrication flow passage)
113 lubrication oil passage (intra-case lubrication flow passage)
114A, 114B axial hole
120A first cooling flow passage
120B second cooling flow passage
121A first electric motor lubrication flow passage
121B second electric motor lubrication flow passage
122A first planetary gear type speed reducer lubrication flow passage
122B second planetary gear type speed reducer lubrication flow passage
A1, B1 portions of electric motors to be cooled (portions to be cooled/lubricated)
A2, B2 portions of electric motors to be lubricated (portions to be cooled/lubricated)
A3, B3 portions of planetary gear type speed reducers to be lubricated
E1 one end
E2 other end
LWr left rear wheel (left wheel)
RWr right rear wheel (right wheel)
P virtual plane

The invention claimed is:

1. A vehicle driving device comprising:
an electric motor connected to a wheel of a wheel;
a liquid medium supply device configured to supply a liquid medium to a portion to be cooled/lubricated, which is at least one of a portion of the electric motor to be cooled and a portion of the electric motor to be lubricated; and
a case which accommodates the electric motor and comprises:
a reservoir for reserving the liquid medium;
a cooling/lubrication flow passage through which the liquid medium supply device and the portion of the electric motor to be cooled/lubricated are communicated with each other,
wherein the liquid medium supply device discharges the liquid medium sucked from the reservoir and supplies, via the cooling/lubrication flow passage, the liquid medium to the portion of the electric motor to be cooled/lubricated,
wherein the vehicle driving device further comprises:
a separate member which is detachably provided to the case and on which the liquid medium supply device is provided,
wherein the case comprises an opening which is opened outward, and
wherein in an attached state where a separate member fixation portion of the case and a case fixation portion of the separate member are fixed to each other, the opening of the case is closed by the separate member, and a discharge-side flow passage of the liquid medium supply device, which is provided on the separate member, and the cooling/lubrication flow passage of the case are connected to each other.

2. The vehicle driving device of claim 1,
wherein in the attached state, a connection between the discharge-side flow passage and the cooling/lubrication flow passages is located inwardly from an outer edge of the opening.

3. The vehicle driving device of claim 1, wherein at least a portion of the opening is defined at a position overlapping with the reservoir, and
wherein the separate member constitutes a wall surface of the reservoir in the attached state.

4. The vehicle driving device of claim 1,
wherein the connection is provided inside the case and separated from the separate member fixation portion of the case in an attachment direction, and
wherein in a separation space provided between the connection and the separate member fixation portion in the attachment direction, a valve means is provided for switching a flow passage interposed in the cooling/lubrication flow passage.

5. The vehicle driving device of claim 1,
wherein a suction-side flow passage through which the reservoir and the liquid medium supply device are communicated with each other is extended toward the case beyond the case fixation portion of the separate member, and
wherein a suction port of the suction-side flow passage is located inside the reservoir in the attached state.

6. The vehicle driving device of claim 5,
wherein the suction-side flow passage is provided so as to be located within a parallel projection of an outer edge of the case fixation portion of the separate member.

7. The vehicle driving device of claim 5,
wherein the suction-side flow passage is provided with a filter member for filtering the liquid medium.

8. The vehicle driving device of claim 1, wherein a suction-side flow passage through which the reservoir and the liquid medium supply device are communicated with each other is provided by the separate member.

9. The vehicle driving device of claim 8,
wherein the suction-side flow passage, through which the reservoir and the liquid medium supply device are communicated with each other, is provided by the separate member, and an additional separate member detachably fixed to the separate member, and
wherein the additional separate member is fixed only to the separate member.

10. The vehicle driving device of claim 1, further comprising:
a hydraulic engagement/disengagement means which is disposed on a power transmission path between the electric motor and the wheel and configured to transmit/cut off a power,
wherein the case comprises a hydraulic passage through which the liquid medium supply device and a hydraulic chamber of the hydraulic engagement/disengagement means are communicated with each other, and
wherein the liquid medium supply device supplies the liquid medium to the hydraulic chamber of the hydraulic engagement/disengagement means via the hydraulic passage.

11. The vehicle driving device of claim 10,
wherein in the attached state, the discharge-side flow passage provided in the separate member and the hydraulic passage of the case are connected to each other.

12. The vehicle driving device of claim 11,
wherein in the attached state, a connection between the discharge-side flow passage and the hydraulic passage is located inward from an outer edge of the opening.

13. The vehicle driving device of claim 1, wherein the liquid medium supply device is driven by an additional electric motor which is different from the first and second electric motors.

14. The vehicle driving device of claim 1,
wherein the electric motor comprises a first electric motor and a second electric motor,
wherein the cooling/lubrication flow passage comprises:
a first cooling/lubrication flow passage through which the liquid medium supply device and the portion of the first electric motor to be cooled/lubricated are communicated with each other; and
a second cooling/lubrication flow passage through which the liquid medium supply device and the portion of the second electric motor to be cooled/lubricated are communicated with each other,
wherein the first and second cooling/lubrication flow passages comprises a common flow passage which is shared on a side of the liquid medium supply device, and
wherein the discharge-side flow passage, which is provided on the separate member, and the common flow passage of the case are connected to each other in the attached state.

15. The vehicle driving device of claim 14, wherein the first electric motor drives a left wheel of the vehicle, and the second electric motor drives a right wheel of the vehicle.

16. A vehicle driving device comprising:
an electric motor connected to a wheel of a vehicle;
a liquid medium supply device configured to supply a liquid medium to a portion to be cooled/lubricated, which is at least one of a portion of the electric motor to be cooled and a portion of the electric motor to be lubricated; and
a case which accommodates the electric motor and comprises a reservoir for reserving the liquid medium,
wherein the liquid medium supply device discharges the liquid medium sucked from the reservoir and supplies the liquid medium to the portion of the electric motor to be cooled/lubricated,
wherein the vehicle driving device further comprises:
a separate member which is detachably provided to the case and on which the liquid medium supply device is provided,
wherein the case comprises an opening which is opened outward, and
wherein at least a portion of the opening is located to overlap with the reservoir, and
wherein in an attached state where a separate member fixation portion of the case and a case fixation portion of the separate member are fixed to each other, the opening of the case is closed by the separate member, and the separate member constitutes a wall surface of the reservoir.

17. The vehicle driving device of claim 16,
wherein the separate member comprises a valve means for switching a flow passage thorough which the liquid medium passes, and
wherein in the attached state, the valve means is provided to extend toward an inside of the case from the opening of the case.

18. The vehicle driving device of claim 16,
wherein a suction-side flow passage through which the reservoir and the liquid medium supply device are communicated with each other is extended toward the case beyond the case fixation portion of the separate member, and
wherein a suction port of the suction-side flow passage is located inside the reservoir in the attached state.

19. The vehicle driving device of claim 18,
wherein the suction-side flow passage is provided so as to be located within a parallel projection of an outer edge of the case fixation portion of the separate member.

20. The vehicle driving device of claim 18,
wherein the suction-side flow passage is provided with a filter member for filtering the liquid medium.

21. The vehicle driving device of claim 16,
wherein a suction-side flow passage through which the reservoir and the liquid medium supply device are communicated with each other is provided by the separate member.

22. The vehicle driving device of claim 21,
wherein the suction-side flow passage, through which the reservoir and the liquid medium supply device are communicated with each other, is provided by the separate member, and an additional separate member detachably fixed to the separate member, and
wherein the additional separate member is fixed only to the separate member.

* * * * *